US012112737B1

(12) United States Patent
Pai et al.

(10) Patent No.: US 12,112,737 B1
(45) Date of Patent: Oct. 8, 2024

(54) ACOUSTIC FEEDBACK CONTROL

(71) Applicant: Amazon Technologies, Inc., Seattle, WA (US)

(72) Inventors: Wan-Chieh Pai, San Jose, CA (US); Harsha Inna Kedage Rao, Campbell, CA (US); Andrew Jackson Stockton X, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 17/954,815

(22) Filed: Sep. 28, 2022

(51) Int. Cl.
*G10K 11/178* (2006.01)
*H04R 3/02* (2006.01)

(52) U.S. Cl.
CPC ......... *G10K 11/17854* (2018.01); *H04R 3/02* (2013.01)

(58) Field of Classification Search
CPC ............................ G10K 11/17854; H04R 3/02
See application file for complete search history.

(56) References Cited

U.S. PATENT DOCUMENTS

2021/0014593 A1* 1/2021 Araki ............... G10K 11/17825
2023/0254633 A1* 8/2023 Fridman .......... G10K 11/17819 381/71.1

FOREIGN PATENT DOCUMENTS

EP 2237573 A1 * 10/2010 ....... G10K 11/17819

* cited by examiner

*Primary Examiner* — David L Ton
(74) *Attorney, Agent, or Firm* — Pierce Atwood LLP

(57) ABSTRACT

A system configured to perform acoustic feedback control to enable a device to perform hearing enhancement while suppressing acoustic feedback. During hearing enhancement, the device may amplify environmental noise based on a unique hearing profile associated with the user, personalizing equalization settings, a dynamic range, and/or other characteristics to optimize playback audio for the user. The acoustic feedback control may include an acoustic feedback cancellation (AFC) component that uses an adaptive filter to estimate and cancel a feedback signal. In addition, the AFC component may perform entrainment prevention by detecting periodic signals and adjusting an adaptation rate of the adaptive filter accordingly. Separately, the device may selectively suppress acoustic feedback by detecting frequency bands representing acoustic feedback (e.g., squeal detection) and applying one or more notch filter(s) to suppress the selected frequency bands (e.g., squeal suppression).

20 Claims, 23 Drawing Sheets

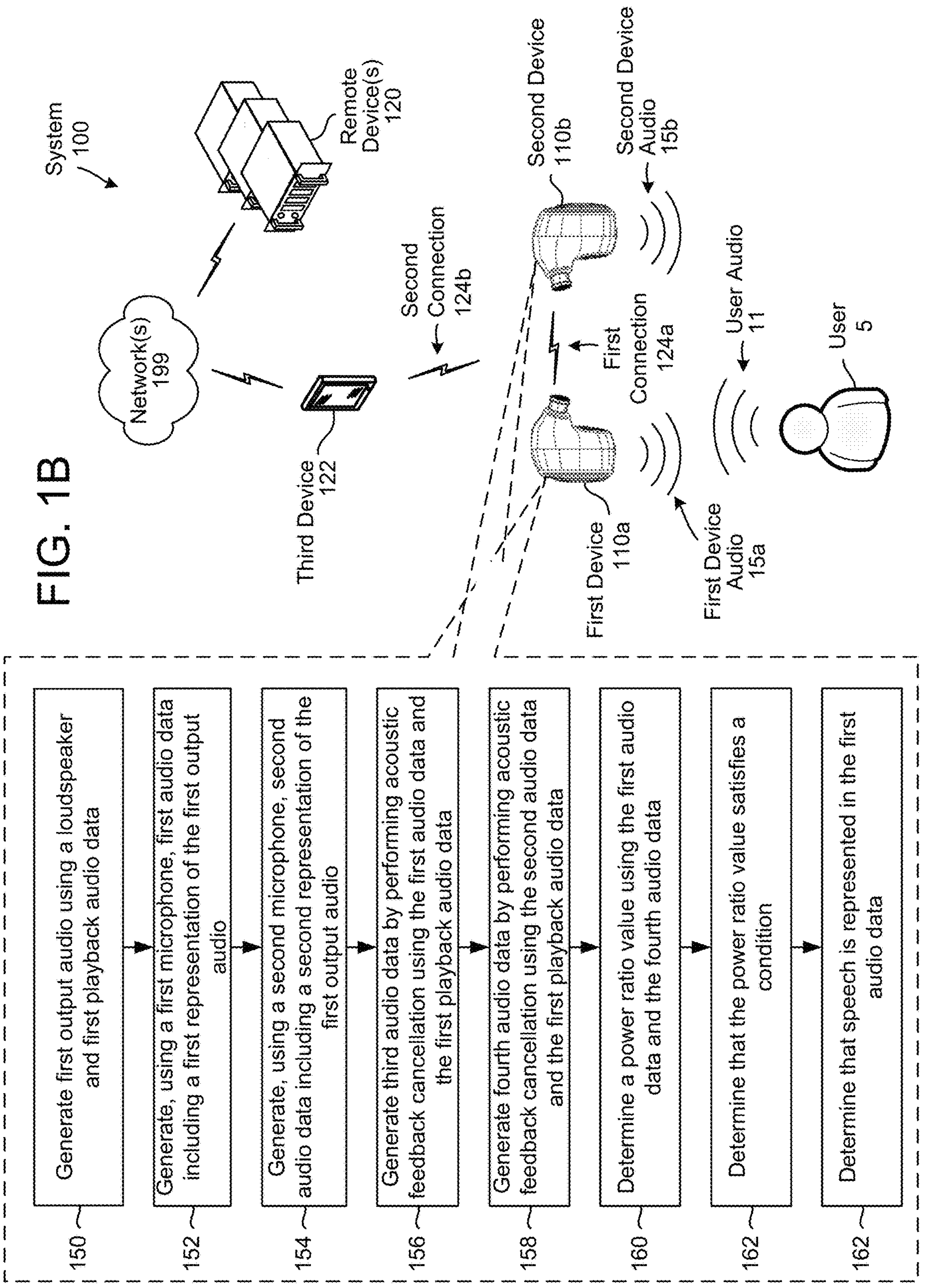
FIG. 1B
System 100
Network(s) 199
Remote Device(s) 120
Third Device 122
Second Connection 124b
Second Device 110b
Second Device Audio 15b
First Connection 124a
User Audio 11
User 5
First Device 110a
First Device Audio 15a
150 Generate first output audio using a loudspeaker and first playback audio data
152 Generate, using a first microphone, first audio data including a first representation of the first output audio
154 Generate, using a second microphone, second audio data including a second representation of the first output audio
156 Generate third audio data by performing acoustic feedback cancellation using the first audio data and the first playback audio data
158 Generate fourth audio data by performing acoustic feedback cancellation using the second audio data and the first playback audio data
160 Determine a power ratio value using the first audio data and the fourth audio data
162 Determine that the power ratio value satisfies a condition
162 Determine that speech is represented in the first audio data

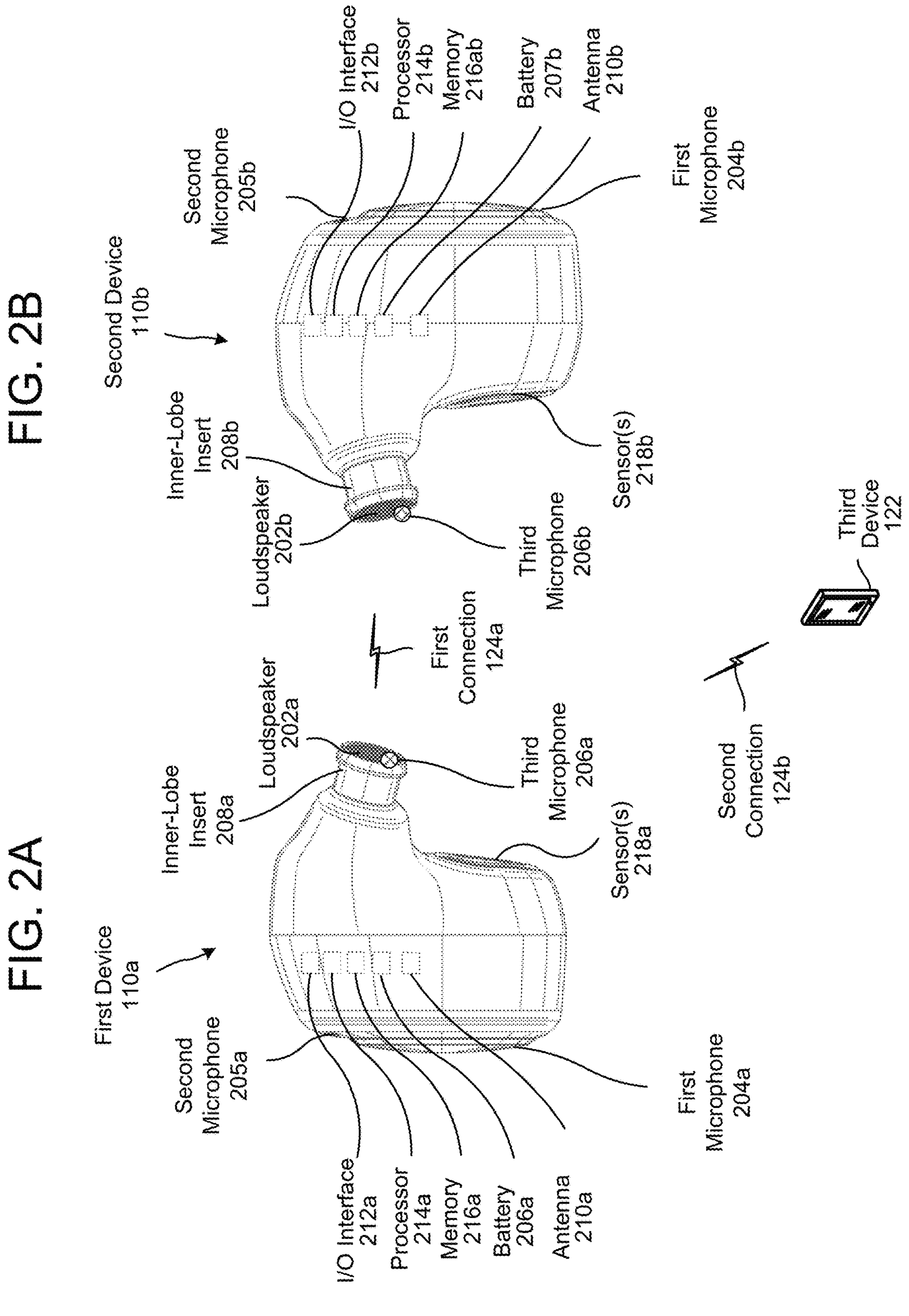
FIG. 2A
First Device 110a
Second Microphone 205a
I/O Interface 212a
Processor 214a
Memory 216a
Battery 206a
Antenna 210a
First Microphone 204a
Inner-Lobe Insert 208a
Loudspeaker 202a
Third Microphone 206a
Sensor(s) 218a
FIG. 2B
Second Device 110b
Second Microphone 205b
I/O Interface 212b
Processor 214b
Memory 216ab
Battery 207b
Antenna 210b
First Microphone 204b
Inner-Lobe Insert 208b
Loudspeaker 202b
Third Microphone 206b
Sensor(s) 218b
First Connection 124a
Second Connection 124b
Third Device 122

P78945-US01

P78945-US01

ACOUSTIC FEEDBACK CONTROL

BACKGROUND

With the advancement of technology, the use and popularity of electronic devices has increased considerably. Electronic devices may be connected to headphones that generate output audio. Disclosed herein are technical solutions to improve output audio generated by headphones while reducing acoustic feedback.

BRIEF DESCRIPTION OF DRAWINGS

For a more complete understanding of the present disclosure, reference is now made to the following description taken in conjunction with the accompanying drawings.

FIG. 1B illustrates a wearable audio output device configured to perform hearing enhancement while enabling wakeword detection according to embodiments of the present disclosure.

FIGS. 2A and 2B illustrate devices for performing target speech separation according to embodiments of the present disclosure.

DETAILED DESCRIPTION

Figure 1A:
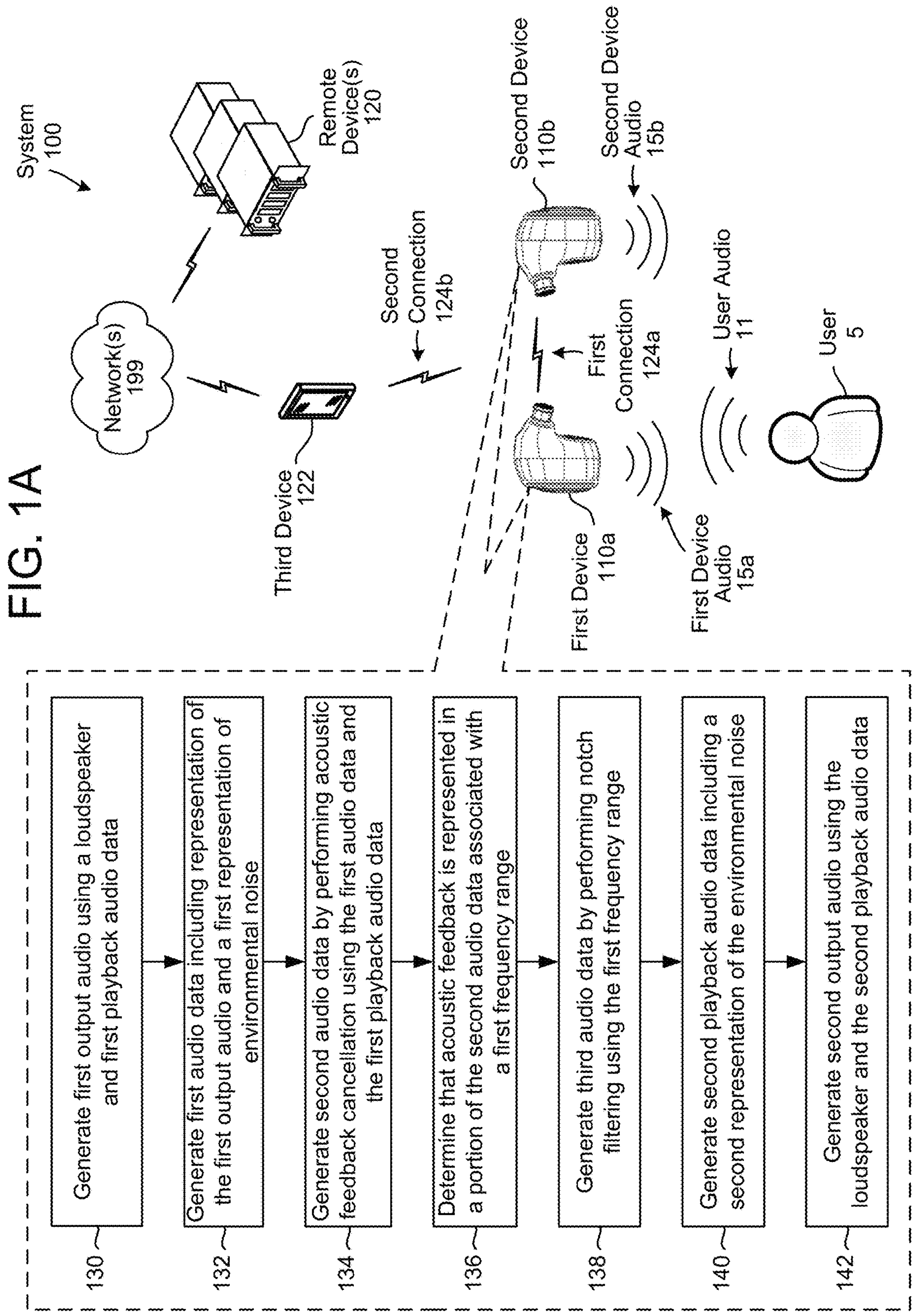
FIG. 1A illustrates a wearable audio output device configured to perform acoustic feedback control according to embodiments of the present disclosure.

Some electronic devices may include an audio-based input/output interface. A user may interact with such a device—which may be, for example, a smartphone, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as a speaker, for outputting audio that in some embodiments responds to and/or prompts for the voice input.

For a variety of reasons, a user may prefer to connect headphones to the device to generate output audio. Headphones may also be used by a user to interact with a variety of other devices. As the term is used herein, “headphones” may refer to any wearable audio input/output device and includes headsets, earphones, earbuds, or any similar device. For added convenience, the user may choose to use wireless headphones, which communicate with the device—and optionally each other—via a wireless connection, such as Bluetooth, Wi-Fi, near-field magnetic induction (NFMI), Long-Term Evolution (LTE), 5G, or any other type of wireless connection.

In certain configurations headphones may deliberately isolate a user’s ear (or ears) from an external environment. Such isolation may include, but is not limited to, earbuds which sit at least partially within a user’s ear canal, potentially creating a seal between the earbud device and the user’s ear which effectively block the inner portions of the ear canal from the external environment. Such isolation may also include providing earcups that envelope a user’s ear, blocking the ear off from the external environment. Such isolation results in a significant physical separation from the ear to one or more external noise sources and may provide certain benefits, such as improving an ability to shield the user from external noises and effectively improve the quality of the audio being output by the headphone, earbud, or the like. Such isolation may assist in improving the performance of active noise cancellation (ANC) or other cancellation/noise reduction technology, whose purpose is to reduce the amount of external noise that is detectable by a user. That is, the significant physical separation provided by the headphone/earbud (which may result, for example, from the seal between an earcup and an ear, the seal between an earbud and an ear canal, etc.) may provide additional benefits to cancellation technology.

To assist users suffering from mild to moderate hearing loss, headphones may provide hearing enhancement by amplifying environmental noise (e.g., ambient sounds) present in the external environment. For example, the headphones may capture environmental noise using a microphone and output the environmental noise to the user. This hearing enhancement enables the user to hear the environment louder, improving their ability to distinguish between sounds, understand speech, and/or the like. However, due to the close proximity between the loudspeaker and the microphone, an acoustic feedback path may be formed as the microphone recaptures the environmental noise output by the loudspeaker and the headphones amplifies the recaptured environmental noise. The acoustic feedback path may create acoustic feedback (e.g., howling or whistling noise), negatively impacting a user experience Proposed is a wearable audio output device configured to perform acoustic feedback control. The acoustic feedback control may improve stability margins, increase an amount of high frequency gain, and attenuate the acoustic feedback, enabling the device to improve a user experience by performing hearing enhancement without the acoustic feedback. The acoustic feedback control may include an acoustic feedback cancellation (AFC) component that uses an adaptive filter to estimate and cancel the leaked feedback signal. In addition, the AFC component may perform entrainment prevention by detecting periodic signals and adjusting an adaptation rate of the adaptive filter accordingly. Separately, the device may selectively suppress acoustic feedback by detecting frequency bands representing acoustic feedback (e.g., squeal detection) and applying notch filter(s) to suppress the selected frequency bands (e.g., squeal suppression).

In some examples, the device may amplify the environmental noise based on a unique hearing profile associated with the user. For example, the device may personalize equalization settings, a dynamic range, and/or other characteristics of the playback audio to optimize the playback audio for the user. In addition, the device may perform hearing enhancement while still enabling wakeword detection (e.g., detecting a keyword and triggering language processing functionality) and/or media playback (e.g., playback of music or other audio content). For example, the user may enable hearing enhancement mode while listening to music, resulting in the device generating the playback audio using a combination of the microphone audio data representing the environmental noise and media audio data representing the music.

FIG. 1A illustrates a wearable audio output device configured to perform acoustic feedback control according to embodiments of the present disclosure. As used herein, the wearable audio output device may correspond to headphone components, such as earbuds or an in-ear device. In the present disclosure, for clarity, headphone components that are capable of wireless communication with both a third device and each other are referred to as "wireless earbuds," but the term "earbud" does not limit the present disclosure to any particular type of wired or wireless headphones. Unlike headphones or earphones, which remain external to the ear, earbuds may reside at least part inside the ear although the disclosure is not limited thereto. The present disclosure may further differentiate between a "right earbud," meaning a headphone component disposed in or near a right ear of a user, and a "left earbud," meaning a headphone component disposed in or near a left ear of a user. A "primary" earbud communicates with both a "secondary" earbud, using a first wireless connection (such as a Bluetooth connection); the primary earbud further communicates with a third device (such as a smartphone, smart watch, or similar device) using a second connection (such as a Bluetooth connection). The secondary earbud communicates directly only with the primary earbud and does not communicate using a dedicated connection directly with the smartphone; communication therewith may pass through the primary earbud via the first wireless connection.

In some examples, the primary and secondary earbuds may include similar hardware and software; in other instances, the secondary earbud contains only a subset of the hardware/software included in the primary earbud. If the primary and secondary earbuds include similar hardware and software, they may trade the roles of primary and secondary prior to or during operation. In the present disclosure, the primary earbud may be referred to as the "first device," the secondary earbud may be referred to as the "second device," and the smartphone or other device may be referred to as the "third device."

As illustrated in FIG. 1A, the system 100 may include a first device 110*a* (e.g., a primary earbud) and a second device 110*b* (e.g., a secondary earbud). The first device 110*a* and the second device 110*b* may communicate using a first wireless connection 124*a*, which may be a Bluetooth, NFMI, or similar connection. In other embodiments, the first device 110*a* and second device 110*b* communicate using a wired connection. The first device 110*a* communicates with a third device 122, such as a smartphone, smart watch, or similar device, using a second connection 124*b*, which may also be a wireless connection such as a Bluetooth Wi-Fi connection or a wired connection.

The present disclosure may refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. In some embodiments, however, a first wireless connection 124*a* between the first device 110*a* and the second device 110*b* is a low-power connection such as BLE; the second wireless connection 124*b* may include a high-bandwidth connection such as EDR in addition to or instead of a BLE connection.

In addition, the first, second, and/or third devices may communicate with one or more supporting device(s) 120, which may be server devices, via a network 199, which may be the Internet, a wide- or local-area network, or any other network. The first device 110*a* may output first output audio 15*a*, and the second device 110*b* may output second output audio 15*b*. The first device 110*a* and second device 110*b* may capture input audio 11 from a user 5, process the input audio 11, and/or send the input audio 11 and/or processed input audio to the third device 122 and/or the supporting device(s) 120, as described in greater detail below.

FIG. 1A illustrates a wearable audio output device configured to perform acoustic feedback control according to embodiments of the present disclosure. The devices 110*a*/110*b* may enable a hearing enhancement mode that may assist users suffering from mild to moderate hearing loss by amplifying environmental noise when hearing enhancement (e.g., hearing loss correction) is active. For example, the devices 110*a*/110*b* may capture environmental noise by generating microphone audio data using an external microphone, may process the microphone audio data to generate playback audio data, and then use the playback audio data and a loudspeaker to generate playback audio that includes a representation of the environmental noise. In some examples, the devices 110a/110b may amplify the environmental noise based on the user's unique hearing profile. For example, the devices 110a/110b may personalize equalization settings, a dynamic range, and/or other characteristics of the playback audio to optimize the playback audio for the user. Thus, the devices 110a/110b may enable the user to hear the environment louder, improving their ability to distinguish between sounds, understand speech, and/or the like.

As will be described in greater detail below, the devices 110a/110b may perform hearing enhancement while still enabling wakeword detection (e.g., detecting a keyword and triggering language processing functionality) and/or media playback (e.g., playback of music or other audio content). For example, the user may enable hearing enhancement mode while listening to music, resulting in the devices 110a/110b generating the playback audio using a combination of the microphone audio data representing the environmental noise and media audio data representing the music. However, the disclosure is not limited thereto, and in other examples the devices 110a/110b may enable hearing enhancement mode without performing media playback, resulting in the devices 110a/110b generating the playback audio using only the microphone audio data representing the environmental noise.

As illustrated in FIG. 1A, the device 110 may generate (130) first output audio using a loudspeaker and first playback audio data and may generate (132) first audio data including a representation of the first output audio and a first representation of environmental noise. For example, the device 110 may generate the first output audio and the first audio data may recapture a portion of the first output audio as acoustic feedback. Thus, the device 110 may generate (134) second audio data by performing acoustic feedback cancellation using the first audio data and the first playback audio data. Examples of performing acoustic feedback cancellation (AFC) processing are described in greater detail below with regard to FIGS. 5-7.

The device 110 may determine (136) that acoustic feedback is represented in a portion of the second audio data associated with a first frequency range and may generate (138) third audio data by performing notch filtering using the first frequency range. For example, the device 110 may perform acoustic feedback detection (e.g., squeal detection) to identify a frequency range associated with acoustic feedback and perform notch filtering to attenuate the second audio data within the frequency range. Examples of performing notch filtering are described in greater detail below with regard to FIGS. 12-14.

Finally, the device 110 may generate (140) second playback audio data including a second representation of the environmental noise and may generate (142) second output audio using the loudspeaker and the second playback audio data. Thus, the device 110 may enable the user to hear the environment louder, improving their ability to distinguish between sounds, understand speech, and/or the like.

When the hearing enhancement mode is inactive, the device 110 may determine that the user is talking by performing voice activity detection (VAD) processing based on a power ratio between the external microphones and an internal microphone. For example, the device 110 may determine the power ratio by determining a sum of a first power value associated with a first external microphone and a second power value associated with a second external microphone, and then dividing the sum by a third power value associated with the internal microphone. As the internal microphone is positioned in the user's ear canal, more of the user's speech reaches the internal microphone through the ear canal. Thus, the power ratio is lower when the user is talking and higher when the user is not talking. However, these condition are also detected during hearing enhancement and/or media playback, as more of the playback audio reaches the internal microphone than the external microphones.

To enable speech detection when hearing enhancement mode is active, the device 110 may include an Acoustic Feedback Canceler (AFC) component that removes environmental noise captured by the internal microphone. For example, the AFC component may receive internal audio data generated by the internal microphone and may perform AFC processing using the environment audio data, removing or reducing acoustic feedback associated with the playback audio. To enable speech detection when both hearing enhancement and media playback is active, the device 110 may include an Acoustic Echo Cancellation (AEC) component that removes the playback audio recaptured by the internal microphone (e.g., echo signal). For example, the AEC component may receive the internal audio data generated by the internal microphone and may perform AEC processing using playback audio data, removing or reducing acoustic echo associated with the playback audio.

FIG. 1B illustrates a wearable audio output device configured to perform hearing enhancement while enabling wakeword detection according to embodiments of the present disclosure. As illustrated in FIG. 1B, the device 110 may generate (150) first output audio using a loudspeaker and first playback audio data. For example, the device 110 may perform hearing enhancement and generate the first output audio that includes a representation of environmental noise captured by the device 110.

The device 110 may generate (152) first audio data using a first microphone (e.g., external microphone), the first audio data including a first representation of the first output audio, and generate (154) second audio data using a second microphone, the second audio data including a second representation of the first output audio. The device 110 may generate (156) third audio data by performing acoustic feedback cancellation processing using the first audio data and the first playback audio data and may generate (158) fourth audio data by performing acoustic feedback cancellation processing using the second audio data and the first playback audio data.

The device 110 may determine (160) a power ratio value using the first audio data and the fourth audio data, may determine (162) that the power ratio value satisfies a condition, and may determine (162) that speech is represented in the first audio data. For example, the device 110 may determine that the power ratio value is lower than a threshold value, although the disclosure is not limited thereto. After determining that speech is represented in the first audio data, the device 110 may perform beamforming and send the beamformed audio data to a wakeword engine to determine whether a wakeword is detected.

While hearing enhancement mode increases an amount of ambient noise perceived by the listener, the device 110 may also be configured to perform active noise cancellation (ANC) processing to reduce an amount of ambient noise perceived by the listener. For example, the device 110 may include one or more feed forward microphones and/or one or more feedback microphones that enable the device to perform feed forward ANC processing, feedback ANC processing, and/or hybrid ANC processing. Such ANC (or other cancellation/noise reduction operations) may be manually activated (and deactivated) by a user controlling the headphones (or a connected device) and/or may be automatically activated by the headphones (or a connected device) depending on system configuration. To illustrate an example, the device 110 may perform ANC processing to reduce the user's perception of a noise source in an environment of the device 110. In some examples, the ANC processing may detect ambient noise generated by the noise source and may cancel at least a portion of the ambient noise (e.g., reduce a volume of the ambient noise). For example, the ANC processing may identify the ambient noise and generate a signal that mirrors the ambient noise with a phase mismatch, which cancels/reduces the ambient noise due to destructive interference.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as acoustic feedback cancellation (AFC) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

The device 110 may include multiple microphones 112 configured to capture sound and pass the resulting audio signal created by the sound to a downstream component for further processing. Each individual piece of audio data captured by a microphone may be in a time domain. To isolate audio from a particular direction, the device may compare the audio data (or audio signals related to the audio data, such as audio signals in a subband domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. For example, a particular direction may be associated with azimuth angles divided into bins (e.g., 0-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones 112. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, as explained below.

The device 110 may use various techniques to determine the beam corresponding to the look-direction. For example, the device 110 may use techniques (either in the time domain or in the subband domain) such as calculating a signal-to-noise ratio (SNR) for each beam, performing voice activity detection (VAD) on each beam, or the like, although the disclosure is not limited thereto.

Beamforming systems isolate audio from a particular direction in a multi-directional audio capture system. As the terms are used herein, an azimuth direction refers to a direction in the XY plane with respect to the system, and elevation refers to a direction in the Z plane with respect to the system. One technique for beamforming involves boosting target audio received from a desired azimuth direction and/or elevation while dampening noise audio received from a non-desired azimuth direction and/or non-desired elevation.

After identifying the look-direction associated with the speech, the device 110 may use a FBF unit or other such component to isolate audio coming from the look-direction using techniques known to the art and/or explained herein. For example, the device 110 may boost audio coming from a particular direction, thus increasing the amplitude of audio data corresponding to speech from user relative to other audio captured from other directions. In this manner, noise from diffuse sources that is coming from all the other directions will be dampened relative to the desired audio (e.g., speech from the user) coming from the selected direction.

In some examples, the device 110 may be configured to perform beamforming using a fixed beamformer unit and/or an adaptive noise canceller unit that can remove noise from particular directions using adaptively controlled coefficients which can adjust how much noise is cancelled from particular directions. The FBF unit may be a separate component or may be included in another component such as an adaptive beamformer (ABF) unit. In some examples, the FBF unit may operate a filter and sum component to isolate the first audio signal from the direction of an audio source, although the disclosure is not limited thereto.

The device 110 may also operate an adaptive noise canceller unit to amplify audio signals from directions other than the direction of an audio source. Those audio signals represent noise signals so the resulting amplified audio signals from the ABF unit may be referred to as noise reference signals, discussed further below. The device 110 may then weight the noise reference signals, for example using filters, and may combine the weighted noise reference signals into a combined (weighted) noise reference signal. Alternatively the device 110 may not weight the noise reference signals and may simply combine them into the combined noise reference signal without weighting. In this manner, noise reference signals are used to adaptively estimate the noise contained in the output signal of the FBF unit using the noise-estimation filters.

The device 110 may then subtract the combined noise reference signal from the amplified first audio signal to obtain a difference signal. The device 110 may then output that difference signal, which represents the desired output audio signal with the noise removed. The diffuse noise is removed by the FBF unit when determining the amplified first audio signal and the directional noise is removed when the combined noise reference signal is subtracted.

The device 110 may also use the difference signal to adaptively update the coefficients of the noise-estimation filters. For example, the device 110 may use the difference signal to create updated weights for the filters, and these updated weights may be used to weight future audio signals. To modulate a speed at which one weight adapts to an updated weight (e.g., rate of adaptation or adaptation rate), the device 110 may include a robust step-size controller that may be configured to control the rate of adaptation of the noise estimation filters.

FIGS. 2A and 2B illustrate an embodiment of the first device 110*a* and second device 110*b*, respectively. As shown, the first device 110*a* and the second device 110*b* have similar features; in other embodiments, as noted above, the second device 110*b* (e.g., the secondary device) may have only a subset of the features of the first device 110*a*. As illustrated, the first device 110*a* and second device 110*b* are depicted as wireless earbuds having an inner-lobe insert; as mentioned above, however, the present disclosure is not limited to only wireless earbuds, and any wearable audio input/output system, such as a headset, over-the-ear headphones, or other such systems, is within the scope of the present disclosure.

The devices 110*a*/110*b* may include one or more loudspeaker(s) 114 (e.g., loudspeaker 202*a*/202*b*), one or more external microphone(s) 112 (e.g., first microphones 204*a*/204*b* and second microphones 205*a*/205*b*), and one or more internal microphone(s) 112 (e.g., third microphones 206*a*/206*b*). The loudspeaker 114 may be any type of loudspeaker, such as an electrodynamic speaker, electrostatic speaker, diaphragm speaker, or piezoelectric loudspeaker; the microphones 112 may be any type of microphones, such as piezoelectric or MEMS microphones. Each device 110*a*/110*b* may include one or more microphones 112.

As illustrated in FIGS. 2A-2B, the loudspeaker 202*a*/202*b* and the microphones 204*a*/204*b*/205*a*/205*b*/206*a*/206*b* may be mounted on, disposed on, or otherwise connected to the device 110*a*/110*b*. The devices 110*a*/110*b* further include an inner-lobe insert 208*a*/208*b* that may bring the loudspeaker 202*a*/202*b* and/or the third microphone(s) 206*a*/206*b* closer to the eardrum of the user and/or block some ambient noise.

Figure 3:
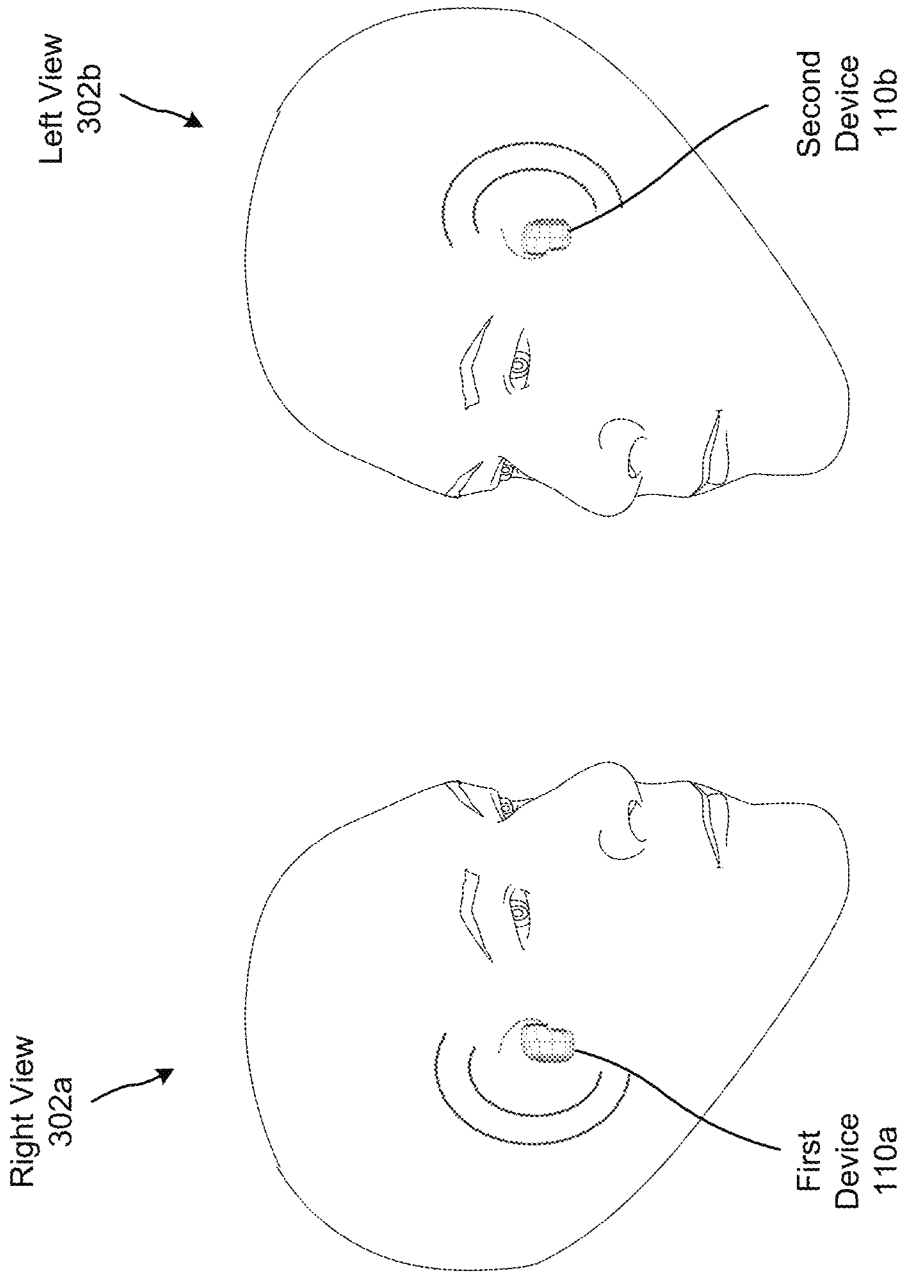
FIG. 3 illustrates various views of use of devices for performing target speech separation according to embodiments of the present disclosure.

One or more batteries 207*a*/207*b* may be used to supply power to the devices 110*a*/110*b*. One or more antennas 210*a*/210*b* may be used to transmit and/or receive wireless signals over the first connection 124*a* and/or second connection 124*b*; an I/O interface 212*a*/212*b* contains software and hardware to control the antennas 210*a*/210*b* and transmit signals to and from other components. A processor 214*a*/214*b* may be used to execute instructions in a memory 216*a*/216*b*; the memory 216*a*/216*b* may include volatile memory (e.g., random-access memory) and/or non-volatile memory or storage (e.g., flash memory). One or more sensors 218*a*/218*b*, such as accelerometers, gyroscopes, or any other such sensor may be used to sense physical properties related to the devices 110*a*/110*b*, such as orientation; this orientation may be used to determine whether either or both of the devices 110*a*/110*b* are currently disposed in an ear of the user (i.e., the "in-ear" status of each device). FIG. 3 illustrates a right view 302*a* and a left view 302*b* of a user of the first device 110*a* and the second device 110*b*.

Figure 4A:
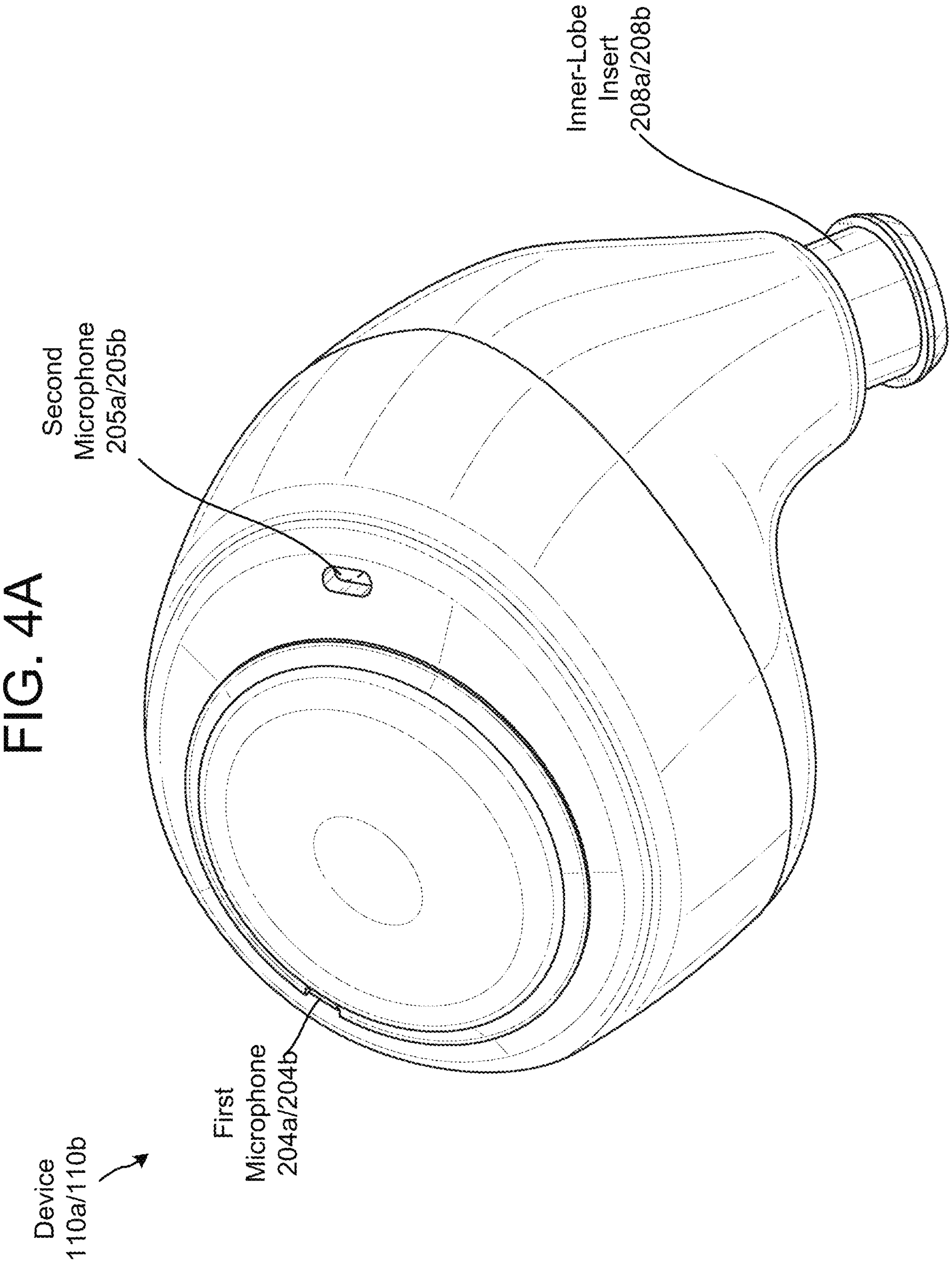
FIGS. 4A, 4B, and 4C illustrate various views of devices for performing target speech separation according to embodiments of the present disclosure.
Figure 4B:
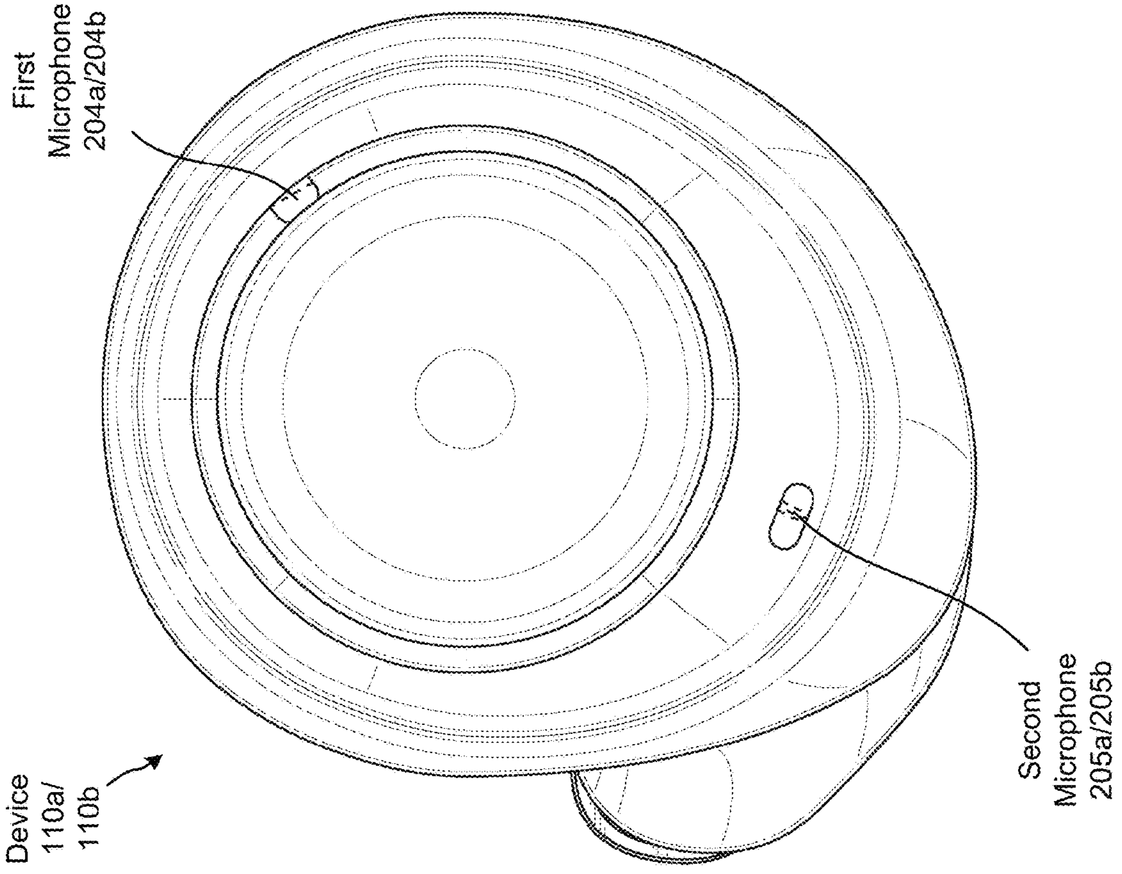
Figure 4C:
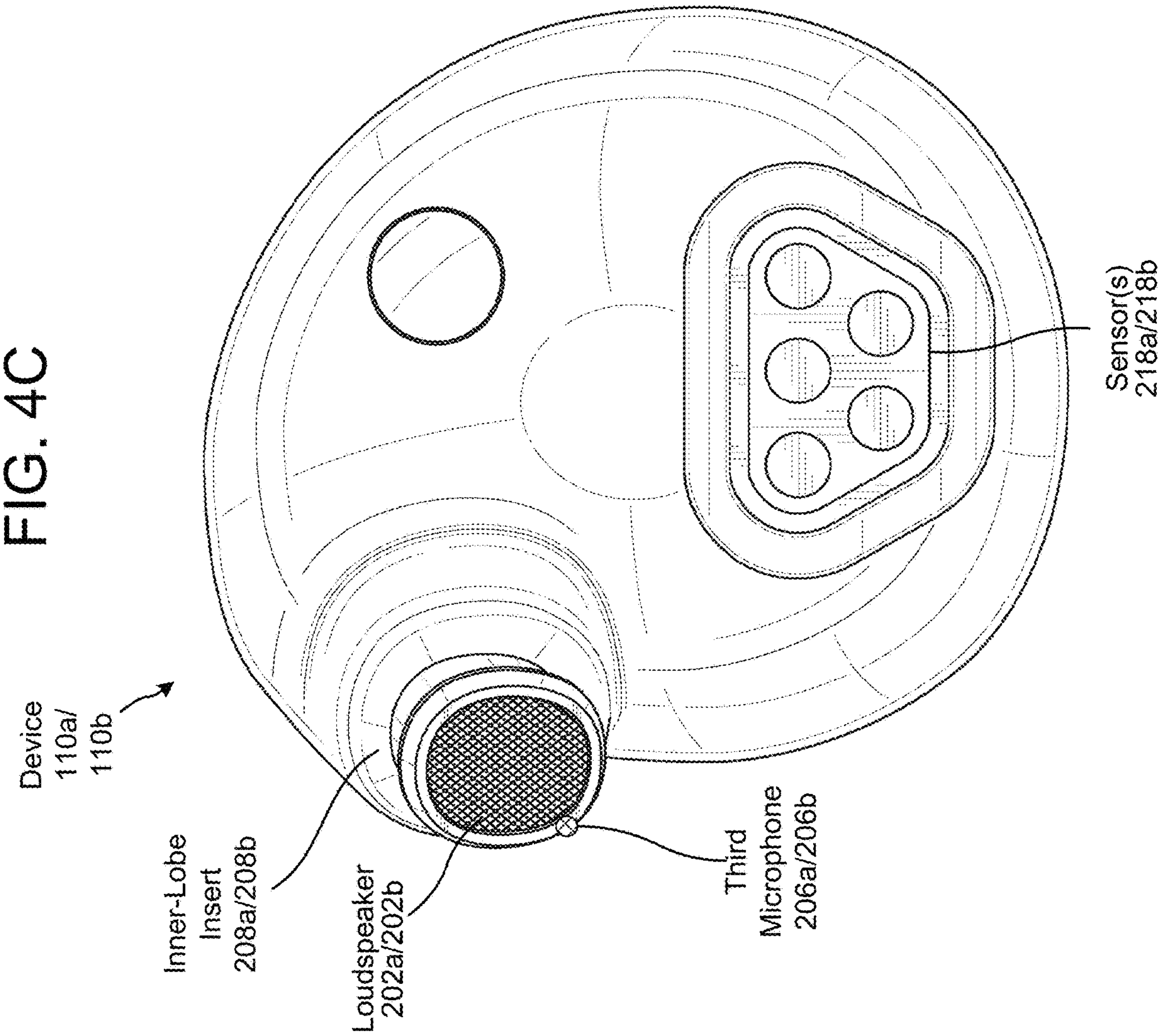

FIGS. 4A, 4B, and 4C illustrate various views of devices for performing target speech separation according to embodiments of the present disclosure. FIG. 4A illustrates one embodiment of placement of the first microphone 204*a*/204*b* and of the second microphone 205*a*/205*b*. The first microphone 204*a*/204*b* is disposed farther from the inner-lobe insert 208*a*/208*b* than is the second microphone 205*a*/205*b*; the first microphone 204*a*/204*b* may thus be disposed closer to the mouth of the user and may therefore receive audio having a higher signal-to-noise ratio than does the second microphone 205*a*/205*b*. FIG. 4B illustrates another one embodiment of the placement of the first microphone 204*a*/204*b* and the second microphone 205*a*/205*b*. FIG. 4C illustrates one embodiment of the placement of the loudspeaker 202*a*/202*b*, third microphone 206*a*/206*b*, inner-lobe insert 208*a*/208*b*, and sensor(s) 218*a*/218*b*. The present disclosure is not limited, however, to only these placements, and other placements of the microphones are within its scope.

Figure 5:
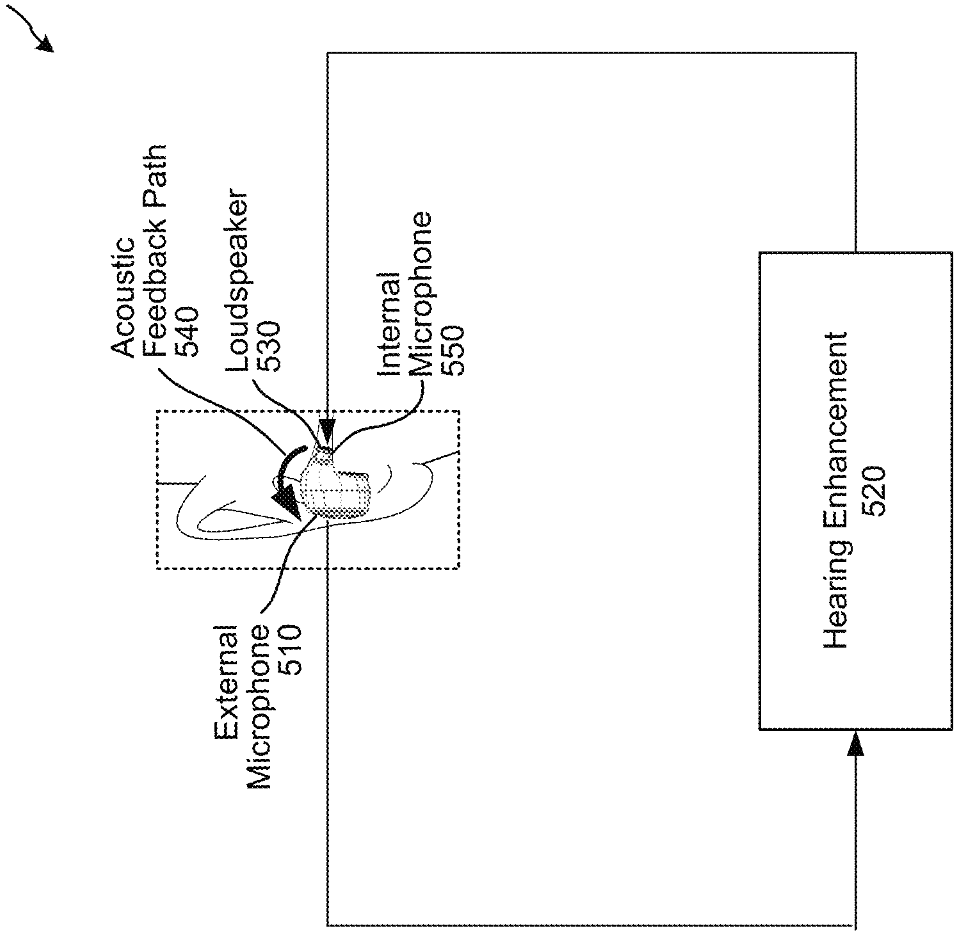
FIG. 5 illustrates an example of hearing enhancement mode and a resulting acoustic feedback path according to embodiments of the present disclosure.

FIG. 5 illustrates an example of hearing enhancement mode and a resulting acoustic feedback path according to embodiments of the present disclosure. As illustrated in FIG. 5, the device 110 may enable a hearing enhancement mode 500 that may assist users suffering from mild to moderate hearing loss by amplifying environmental noise when hearing enhancement (e.g., hearing loss correction) is active. For example, the device 110 may capture environmental noise by generating first microphone audio data using an external microphone 510, may process the first microphone audio data using hearing enhancement component(s) 520 to generate playback audio data, and then use a loudspeaker 530 and the playback audio data to generate playback audio that includes a representation of the environmental noise. In some examples, the device 110 may amplify the environmental noise based on the user's unique hearing profile. For example, the hearing enhancement component(s) 520 may personalize equalization settings, a dynamic range, and/or other characteristics of the playback audio to optimize the playback audio for the user. Thus, the hearing enhancement mode 500 may enable the user to hear the environment louder, improving their ability to distinguish between sounds, understand speech, and/or the like.

Due to the close proximity between the loudspeaker 530 and the external microphone 510, an acoustic feedback path 540 may be formed. If the acoustic feedback path 540 does not satisfy the Nyquist stability criterion, the device 110 may become unstable and/or create acoustic feedback (e.g., howling or whistling noise), negatively impacting a user experience. To prevent and/or reduce the acoustic feedback, the device 110 may include an Acoustic Feedback Cancellation (AFC) component that is configured to improve stability margins while increasing an amount of high frequency gain. For example, the AFC component may use an adaptive filter to determine an estimated channel impulse response and then cancel (e.g., reduce and/or remove) a leaked feedback signal associated with the acoustic feedback path 540 using the estimated channel impulse response and the playback audio data. In addition, the AFC component may perform entrainment prevention by detecting periodic signals and adjusting an adaptation rate of the adaptive filter accordingly. Separately, the device 110 may suppress acoustic feedback by detecting frequency bands representing acoustic feedback (e.g., squeal detection) and applying notch filter(s) to suppress the selected frequency bands (e.g., squeal suppression). For example, the device 110 may generate second audio data using an internal microphone 550 and perform squeal detection by determining whether the second audio data includes the acoustic feedback.

As will be described in greater detail below, the devices 110*a*/110*b* may perform hearing enhancement while still enabling wakeword detection (e.g., detecting a keyword and triggering language processing functionality) and/or media playback (e.g., playback of music or other audio content). For example, the user may enable hearing enhancement mode 500 while listening to music, resulting in the devices 110*a*/110*b* generating the playback audio using a combination of the microphone audio data representing the environmental noise and media audio data representing the music. However, the disclosure is not limited thereto, and in other examples the devices 110*a*/110*b* may enable hearing enhancement mode 500 without performing media playback, resulting in the devices 110*a*/110*b* generating the playback audio using only the microphone audio data representing the environmental noise.

Additionally or alternatively, the devices 110*a*/110*b* may include one or more AFC component(s) and/or one or more Acoustic Echo Cancellation (AEC) component(s) that enable the devices 110*a*/110*b* to perform wakeword detection regardless of whether the environmental noise and/or the media playback is included in the playback audio. For example, the AFC/AEC component(s) may cancel acoustic feedback and/or acoustic echo while also enabling the devices 110*a*/110*b* to perform speech detection (e.g., using a voice activity detector (VAD) component) and/or wakeword detection (e.g., using a wakeword engine component), although the disclosure is not limited thereto.

Figure 6:
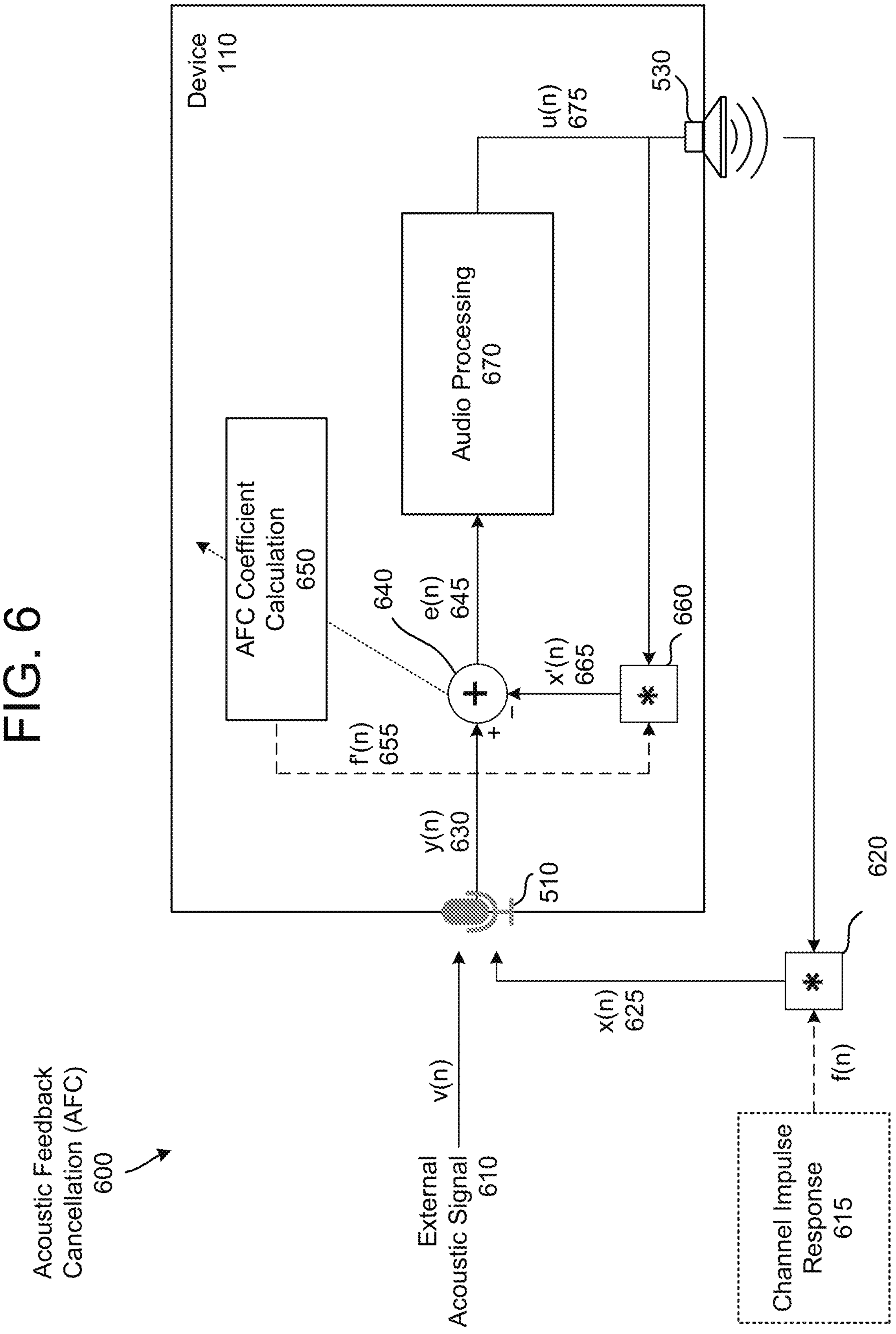
FIG. 6 illustrates an example component diagram for performing acoustic feedback cancellation (AFC) processing according to embodiments of the present disclosure.

FIG. 6 illustrates an example component diagram for performing acoustic feedback cancellation (AFC) processing according to embodiments of the present disclosure. As described above, the close proximity between the loudspeaker 530 and the external microphone 510 may result in the acoustic feedback path 540, in which a portion of the playback audio generated by the loudspeaker 530 leaks to the external microphone 510 and is fed back into the hearing enhancement component(s) 520. As illustrated in FIG. 6, the device 110 may perform acoustic feedback cancellation (AFC) 600 by using an adaptive filter to determine AFC coefficient values, determining estimated acoustic feedback using the AFC coefficient values and the playback audio data, and then cancelling (e.g., reducing and/or removing) the estimated acoustic feedback from a microphone signal generated by the external microphone 510.

In the example illustrated in FIG. 6, the acoustic feedback path results in a portion of the playback audio leaking from the loudspeaker 530 to the external microphone 510 and adding to environmental noise. For example, the external microphone 510 may generate a microphone signal 630 [y(n)] that captures a first representation of an external acoustic signal 610 [v(n)] and a first representation of the leaked feedback signal 625 [x(n)], although the disclosure is not limited thereto.

As used herein, the leaked feedback signal 625 may be referred to as acoustic feedback (e.g., an acoustic feedback signal), acoustic leakage (e.g., an acoustic leakage signal), and/or the like without departing from the disclosure. An amount of leakage associated with the leaked feedback signal 625 may depend on a channel impulse response 615 [f(n)] associated with the device 110, which represents an impulse response between the loudspeaker 530 and the external microphone 510. For example, FIG. 6 illustrates that the leaked feedback signal 625 [x(n)] corresponds to a convolution operation 620 using the playback signal 675 [u(n)] sent to the loudspeaker 530 and the channel impulse response 615 [f(n)]. Thus, the leaked feedback signal 625 may be represented as x(n)=f(n)*u(n), where * denotes the convolution operation, although the disclosure is not limited thereto.

To conceptually illustrate how the AFC processing 600 is performed, FIG. 6 depicts (i) the leaked feedback signal 625 [x(n)] as a function of the channel impulse response 615 [f(n)] and the playback signal 675 [u(n)], and (ii) the external acoustic signal 610 [v(n)] and the leaked feedback signal 625 [x(n)] as separate signals. However, neither the external acoustic signal 610 [v(n)] or the leaked feedback signal 625 [x(n)] is known to the device 110, meaning that the device 110 generates the microphone signal 630 [y(n)] using a combination of the external acoustic signal 610 [v(n)] and the leaked feedback signal 625 [x(n)] and cannot distinguish between the two.

Instead, the device 110 may perform the AFC processing 600 by approximating the channel impulse response 615 [f(n)] and using this approximation to determine an estimated feedback signal 665 [x'(n)]. As illustrated in FIG. 6, the device 110 may approximate the channel impulse response 615 [f(n)] using an AFC coefficient calculation component 650 that is configured to generate an estimated channel impulse response 655 [f(n)]. The device 110 may then determine the estimated feedback signal 665 [x'(n)] by performing a convolution operation 660 using the estimated channel impulse response 655 [f(n)] and the playback signal 675 [u(n)] sent to the loudspeaker 530. Thus, the estimated feedback signal 665 [x'(n)] may be represented as x'(n)=f(n)*u(n), where * denotes the convolution operation, although the disclosure is not limited thereto.

After approximating the leaked feedback signal 625 [x(n)] by determining the estimated feedback signal 665 [x'(n)], the device 110 may finish the AFC processing 600 by reducing and/or removing the estimated feedback signal 665 [x'(n)] from the microphone signal 630 [y(n)] using a canceler component 640. For example, the canceler component 640 may subtract the estimated feedback signal 665 [x'(n)] from the microphone signal 630 [y(n)] to generate an error signal 645 [e(n)].

The canceler component 640 may send the error signal 645 [e(n)] to an audio processing component 670 configured to perform audio processing (e.g., forward processing) in order to generate the playback signal 675 [u(n)] that will be sent to the loudspeaker 530. For ease of illustration, FIG. 6 illustrates the audio processing component 670 as a single component configured to perform one or more processing steps to generate the playback signal 675. However, the disclosure is not limited thereto and the audio processing component 670 may include two or more discrete components without departing from the disclosure. For example, the audio processing component 670 may include a low delay filterbank component configured to perform filtering, noise reduction processing, dynamic range compression, and/or the like, an insertion gain filter component configured to add gain to higher frequencies, a notch filter component configured to perform filtering to reduce acoustic feedback, an equalizer component configured to perform equalization processing, a limiter component configured to avoid over-saturation of the loudspeaker 530, and/or the like without departing from the disclosure.

A performance of the AFC processing 600 depends on how well the estimated feedback signal 665 [x'(n)] approximates the leaked feedback signal 625 [x(n)]. For example, if the estimated feedback signal 665 [x'(n)] perfectly approximates the leaked feedback signal 625 [x(n)], an entirety of the leaked feedback signal 625 [x(n)] may be removed from the microphone signal 630 [y(n)] such that the error signal 645 [e(n)] may only include a second representation of the external acoustic signal 610 [v(n)]. However, the disclosure is not limited thereto and any differences between the estimated feedback signal 665 [x'(n)] and the leaked feedback signal 625 [x(n)] may result in the AFC processing 600 reducing (e.g., attenuating) the acoustic feedback without fully removing it. For example, the error signal 645 [e(n)] may include a second representation of the external acoustic signal 610 [v(n)] and a second representation of the leaked feedback signal 625 [x(n)], where a first amplitude of the first representation of the leaked feedback signal 625 [x(n)] is larger than a second amplitude of the second representation of the leaked feedback signal 625 [x(n)] without departing from the disclosure.

While FIG. 6 illustrates an example of performing AFC processing 600 using an Acoustic Echo Cancellation (AEC) structure, the disclosure is not limited thereto. For example, the performance of the AFC processing 600 may be limited due to a high correlation between the estimated feedback signal 665 [x'(n)] and the error signal 645 [e(n)] (e.g., the estimated feedback signal 665 [x'(n)] and the error signal 645 [e(n)] are highly correlated). To further improve AFC processing, the device 110 may perform AFC processing using a prediction error method (PEM) technique, a normalized least means squares (NLMS) technique, a combination thereof, and/or the like without departing from the disclosure. For example, a combined PEM-NLMS technique may be very effective in reducing a correlation between the estimated feedback signal 665 [x'(n)] and the error signal 645 [e(n)], enabling the adaptive filter to converge to the actual acoustic feedback path (e.g., the estimated feedback signal 665 closely [x'(n)] approximates the leaked feedback signal 625 [x(n)]). However, the disclosure is not limited thereto and the device 110 may use other techniques, such as frequency modulation, white noise injection, phase disturbance, and/or the like without departing from the disclosure.

Figure 7:
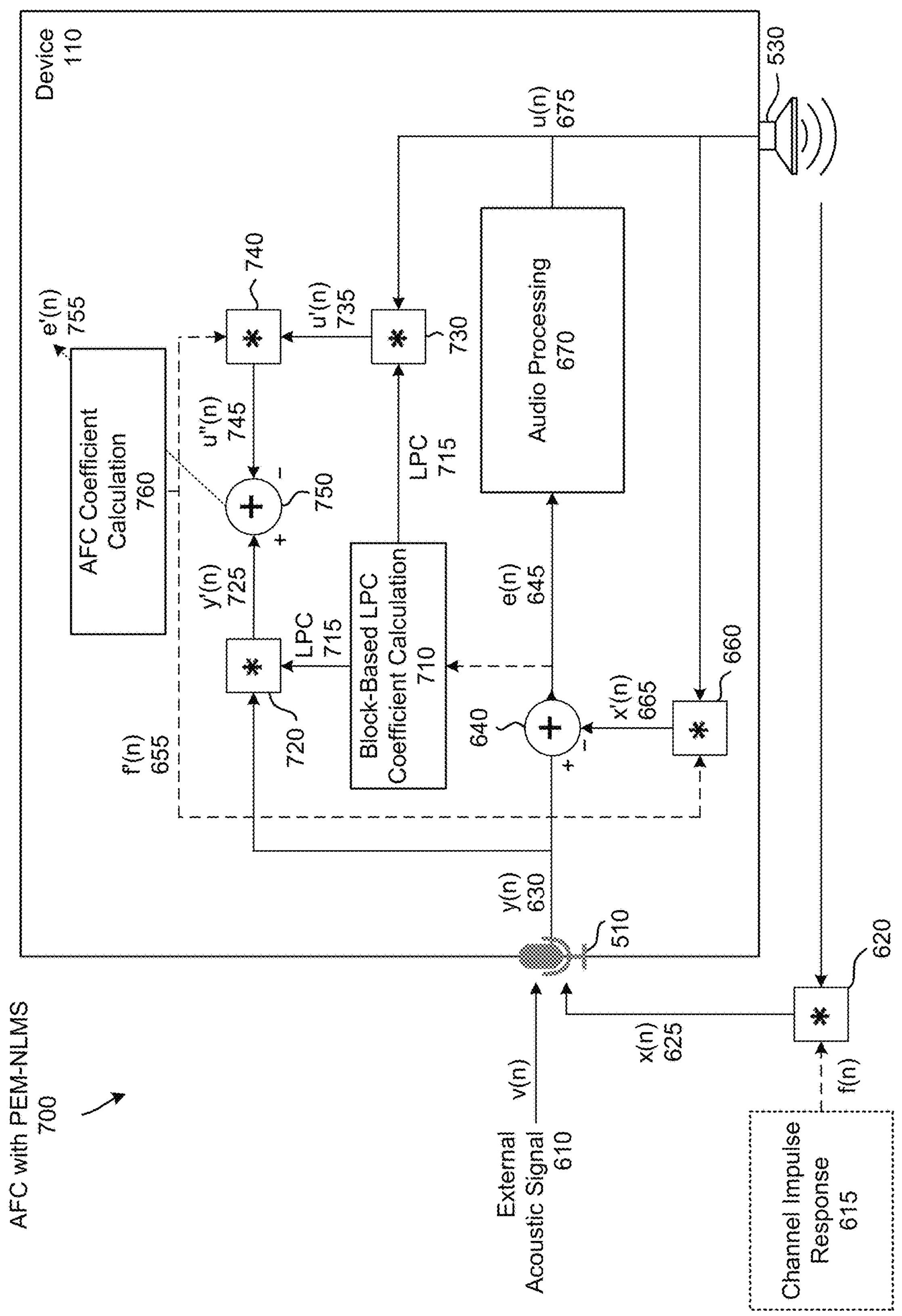
FIG. 7 illustrates an example component diagram for performing acoustic feedback cancellation using linear predictive coding (LPC) coefficients according to embodiments of the present disclosure.

FIG. 7 illustrates an example component diagram for performing acoustic feedback cancellation using linear predictive coding (LPC) coefficients according to embodiments of the present disclosure. As illustrated in FIG. 7, in some examples the device 110 may perform AFC with PEM-NLMS processing 700, which uses LPC coefficient values to reduce the correlation between the estimated feedback signal 665 [x'(n)] and the error signal 645 [e(n)]. For example, instead of calculating the estimated channel impulse response 655 [f(n)] directly from the error signal 645 [e(n)], the device 110 may use the error signal 645 [e(n)] and a block-based LPC coefficient calculation component 710 to determine LPC coefficient values 715.

As illustrated in FIG. 7, the device 110 may perform a first convolution operation 720 between the LPC coefficient values 715 and the microphone signal 630 [y(n)] to generate a modified microphone signal 725 [y'(n)]. Similarly, the device 110 may perform a second convolution operation 730 between the LPC coefficient values 715 and the playback signal 675 [u(n)] to generate a first modified playback signal 735 [u'(n)]. The device 110 may then perform a third convolution operation 740 between the first modified playback signal 735 [u'(n)] and the estimated channel impulse response 655 [f(n)] to determine a second modified playback signal 745 [u"(n)].

The device 110 may reduce and/or remove the second modified playback signal 745 [u"(n)] from the modified microphone signal 725 [y'(n)] using a canceler component 750. For example, the canceler component 750 may subtract the second modified playback signal 745 [u"(n)] from the modified microphone signal 725 [y'(n)] to generate a second error signal 755 [e'(n)]. Thus, instead of using the error signal 645 [e(n)] to generate the estimated channel impulse response 655 [f(n)] as described above with regard to FIG. 6, FIG. 7 illustrates an example in which an AFC coefficient calculation component 760 is configured to generate the estimated channel impulse response 655 [f(n)] using the second error signal 755 [e'(n)]. The device 110 may then perform AFC processing using the estimated channel impulse response 655 [f(n)] and the canceler component 640 to generate the error signal 645 [e(n)] as described above with regard to FIG. 6.

As illustrated in FIGS. 6-7, in some examples performing AFC processing may be similar to performing AEC processing. For example, the AFC processing 600 illustrated in FIG. 6 may use an AEC structure, with the only difference between AFC processing and AEC processing corresponding to how the device 110 models the channel impulse response 615. For example, AEC processing may model the channel impulse response as the impulse response from a loudspeaker to a microphone in an air medium, whereas AFC processing may model the channel impulse response 615 as the acoustic leakage from the loudspeaker 530 to the external microphone 510. As described above, however, using the AEC structure may not be as effective for AFC processing due to the strong correlation between the reference signal and the desired audio signal (e.g., external acoustic signal 610). Thus, AFC processing may be improved using the PEM-NLMS architecture, as illustrated in FIG. 7, as this reduces the correlation between these two signals. While not illustrated in FIGS. 6-7, AFC processing may be performed in a time domain and/or a frequency domain (e.g., subband domain) without departing from the disclosure.

Figure 8:
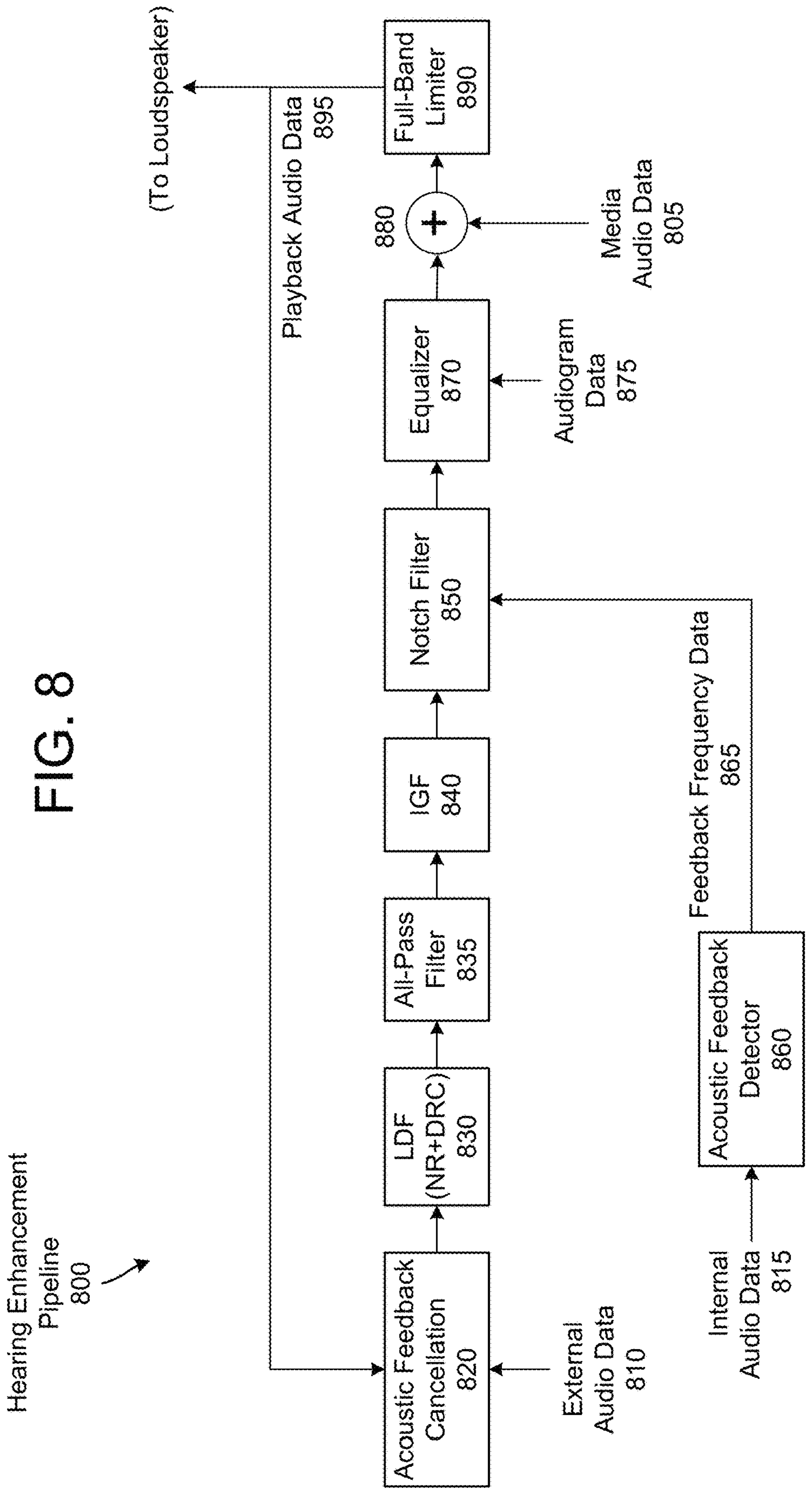
FIG. 8 illustrates an example component diagram for performing hearing enhancement according to embodiments of the present disclosure.

FIG. 8 illustrates an example component diagram for performing hearing enhancement according to embodiments of the present disclosure. As illustrated in FIG. 8, a hearing enhancement pipeline 800 may include an acoustic feedback cancellation (AFC) component 820 that performs AFC processing using the techniques described above with regard to FIGS. 6-7. For example, the AFC component 820 may receive external audio data 810 generated by the external microphone 510 and perform AFC processing using playback audio data 895 that is sent to the loudspeaker 530.

After performing AFC processing to reduce or remove at least some of the acoustic feedback, the hearing enhancement pipeline 800 may process the audio data using a low delay filterbank (LDF) component 830, which may also perform noise reduction (NR) processing and/or dynamic range compression (DRC) processing without departing from the disclosure. For example, the device 110 may perform DRC processing to compress a dynamic range based on a personalized user profile associated with the user. The hearing enhancement pipeline 800 may also include an all-pass filter component 835 configured to decorrelate the signals without modifying gain. For example, the all-pass filter component 835 may enable the device 110 to decorrelate the playback audio data 895 from the external audio data 810, which may improve the acoustic feedback cancellation processing performed by the AFC component 820.

In addition, the hearing enhancement pipeline 800 may include an insertion gain filter (IGF) component configured to selectively apply gain to higher frequencies. For example, when the device 110 is inserted in an ear canal of the user, high frequencies for external sources may be acoustically damped. Thus, the IGF component 840 may act as an output equalizer that restores a magnitude response to a desired value (e.g., 0 dB) relative to an unaided open ear canal. Thus, the IGF component 840 applies filtering to ensure that the response is flat.

In some examples, the hearing enhancement pipeline 800 may include a notch filter component 850 configured to perform notch filtering to further reduce acoustic feedback. For example, the device 110 may detect frequency bands representing the acoustic feedback (e.g., squeal detection) and apply one or more notch filter(s) to suppress the selected frequency bands (e.g., squeal suppression) using the notch filter component 850. As illustrated in FIG. 8, the hearing enhancement pipeline 800 may include an acoustic feedback detector component 860 that is configured to receive internal audio data 815 generated by the internal microphone 550 and process the internal audio data 815 to generate feedback frequency data 865. For example, the acoustic feedback detector component 860 may detect acoustic feedback represented in the internal audio data 815 and may identify individual frequency bands associated with the acoustic feedback. Thus, the feedback frequency data 865 may indicate one or more frequency bands that correspond to the acoustic feedback. The acoustic feedback detector component 860 may send the feedback frequency data 865 to the notch filter component 850 and the notch filter component 850 may perform notch filtering to attenuate the one or more frequency bands indicated by the feedback frequency data 865. Examples of performing notch filtering are described in greater detail below with regard to FIGS. 12-14.

After the notch filter component 850 performs notch filtering to reduce the acoustic feedback and generate filtered audio data, the hearing enhancement pipeline 800 may include an equalizer component 870 configured to perform personalized equalization processing for the user. As illustrated in FIG. 8, the equalizer component 870 may receive audiogram data 875, which may correspond to a unique hearing profile associated with the user. Using the audiogram data 875, the equalizer component 870 may apply personalized equalization settings to optimize the playback audio for the user. For example, the equalizer component 870 may apply gain per frequency band based on the audiogram data 875 (e.g., personalized hearing profile).

After the equalizer component 870, the hearing enhancement pipeline 800 may include a combiner component 880 configured to combine the filtered audio data with media audio data 805 during media playback (e.g., audio playback). As used herein, media playback refers to when the user inputs a command instructing the system 100 to generate output audio corresponding to media content (e.g., music, talk radio, podcast, movie, television show, etc.). During media playback, the combiner component 880 may mix the filtered audio data and the media audio data 805 to generate playback audio data that includes a representation of the environmental noise and a representation of the media content, improving the user's ability to hear the environmental noise while still listening to music or other media content.

When media playback is inactive, in some examples the combiner component 880 may pass the filtered audio data without mixing or other audio processing. However, the disclosure is not limited thereto, and in other examples the combiner component 880 may continue to mix the filtered audio data with the media audio data 805 without departing from the disclosure. For example, when media playback is inactive the media audio data 805 may represent silence, have a relatively low amplitude, and/or the like, such that combining the media audio data 805 with the filtered audio data does not cause distortion or other audible sounds that might impair an audio quality.

After the combiner component 880 generates the playback audio data, either by passing the filtered audio data (e.g., when media playback is inactive) or combining the filtered audio data with the media audio data 805, the combiner component 880 may output the playback audio data to a full-band limiter component 890. The full-band limiter component 890 may process the playback audio data and generate playback audio data 895 that may be sent to the loudspeaker 530, the ACF component 820, and/or additional components of the device 110. For example, the full-band limiter component 890 may be configured to perform full-band limiting to ensure that the playback audio data 895 is within a desired amplitude range to avoid saturation and/or other distortion by the loudspeaker 530.

In some examples, the device 110 may amplify the environmental noise based on the user's unique hearing profile. For example, the hearing enhancement pipeline 800 may personalize equalization settings, a dynamic range, and/or other characteristics of the playback audio to optimize the playback audio for the user without departing from the disclosure. To illustrate an example, the LDF component 830 may perform dynamic range compression based on the hearing profile, ensuring that the dynamic range is compressed based on the user's specific hearing range. The device 110 is not limited thereto, however, and the hearing enhancement pipeline 800 may include additional components not illustrated in FIG. 8 without departing from the disclosure.

As described above, the device 110 may perform hearing enhancement while still enabling wakeword detection (e.g., detecting a keyword and triggering language processing functionality) and/or media playback (e.g., playback of music or other audio content). For example, the user may enable hearing enhancement mode while listening to music, resulting in the device 110 generating the playback audio data 895 using a combination of the external audio data 810 representing the environmental noise and media audio data 805 representing the music. However, the disclosure is not limited thereto, and in other examples the device may enable hearing enhancement mode without performing media playback, resulting in the device 110 generating the playback audio data 895 using only the external audio data 810 representing the environmental noise.

Figure 9:
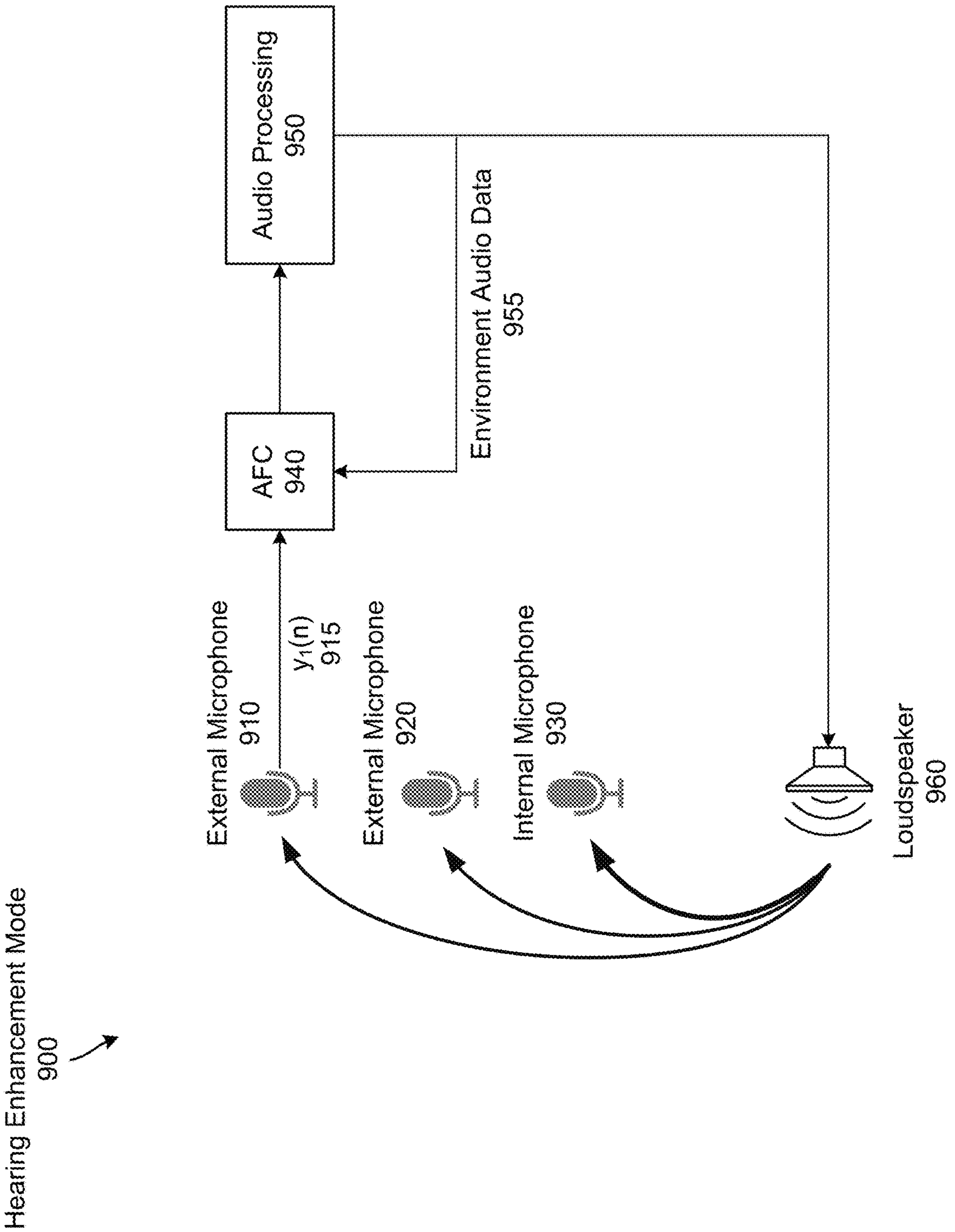
FIG. 9 illustrates an example component diagram for performing acoustic feedback cancellation (AFC) processing during hearing enhancement according to embodiments of the present disclosure.

FIG. 9 illustrates an example component diagram for performing acoustic feedback cancellation (AFC) processing during hearing enhancement according to embodiments of the present disclosure. As some of the components illustrated in FIG. 9 are similar to the components described above with regard to FIGS. 6-8, a redundant description may be omitted.

As illustrated in FIG. 9, during hearing enhancement mode 900 the device 110 may generate first external audio data 915 [$y_1(n)$] using a first external microphone 910 and may use the first external audio data 915 to generate environment audio data 955 that represents environmental noise and is output to the loudspeaker 960. For example, the device 110 may process the first external audio data 915 using an AFC component 940 and an audio processing component 950 to generate the environment audio data 955, which may be sent to the loudspeaker 960 to generate output audio. In addition, the environment audio data 955 may also be fed back to the AFC component 940 in order to perform acoustic feedback cancellation processing.

The audio processing component 950 may be configured to perform audio processing (e.g., forward processing) in order to generate the environment audio data 955 that will be sent to the loudspeaker 960. For ease of illustration, FIG. 9 illustrates the audio processing component 950 as a single component configured to perform one or more processing steps to generate the environment audio data 955. However, the disclosure is not limited thereto and the audio processing component 950 may include two or more discrete components without departing from the disclosure. For example, the audio processing component 950 may include a low delay filterbank component configured to perform filtering, noise reduction processing, dynamic range compression, and/or the like, an insertion gain filter component configured to add gain to higher frequencies, a notch filter component configured to perform filtering to reduce acoustic feedback, an equalizer component configured to perform equalization processing, a limiter component configured to avoid oversaturation of the loudspeaker 960, and/or the like without departing from the disclosure.

While FIG. 9 illustrates an example of the device 110 performing hearing enhancement mode 900 using the first external microphone 910, the disclosure is not limited thereto. In some examples, the device 110 may perform hearing enhancement mode 900 using the first external microphone 910 and a second external microphone 920 without departing from the disclosure. Additionally or alternatively, while FIG. 9 illustrates an example that includes two external microphones 910/920 and a single internal microphone 930, the disclosure is not limited thereto. In some examples, the device 110 may include three or more external microphones and/or two or more internal microphones without departing from the disclosure.

While FIG. 9 illustrates an example in which the hearing enhancement mode 900 only includes a single AFC component (e.g., AFC component 940), the disclosure is not limited thereto. For example, the device 110 may include two or more AFC component(s) without departing from the disclosure. In some examples, one or more of the external microphones 910/920 and/or the internal microphone 930 may be associated with an individual AFC component, enabling the device 110 to reduce and/or remove acoustic feedback from any of the microphone signals as necessary. In addition, the device 110 may use one or more AFC components in order to enable the device 110 to perform wakeword detection even when the environmental noise is included in the output audio, as described below with regard to FIGS. 10A-10B.

Additionally or alternatively, the device 110 may include one or more Acoustic Echo Cancellation (AEC) components in order to enable the device 110 to perform wakeword detection regardless of whether the environmental noise and/or the media playback is included in the output audio, as described below with regard to FIGS. 11A-11B. For example, in addition to the AFC component(s) described above, the device 110 may also include one or more AEC components that are configured to reduce and/or remove acoustic echo from any of the microphone signals as necessary. Thus, the AFC/AEC component(s) may cancel acoustic feedback and/or acoustic echo while also enabling the device 110 to perform speech detection (e.g., using a voice activity detector (VAD) component) and/or wakeword detection (e.g., using a wakeword engine component), although the disclosure is not limited thereto.

When the hearing enhancement mode is inactive, the device 110 may determine that the user is talking by performing voice activity detection (VAD) processing based on a power ratio between the external microphones 910/920 and the internal microphone 930. For example, the device 110 may determine the power ratio by determining a sum of a first power value associated with the first external microphone 910 and a second power value associated with the external microphone 920, and then dividing the sum by a third power value associated with the internal microphone 930. As the internal microphone 930 is positioned in the user's ear canal, more of the user's speech reaches the internal microphone 930 through the ear canal. Thus, the power ratio is lower when the user is talking and higher when the user is not talking. However, these condition are also detected during hearing enhancement and/or media playback, as more of the playback audio reaches the internal microphone 930 than the external microphones 910/920.

Figure 10A:
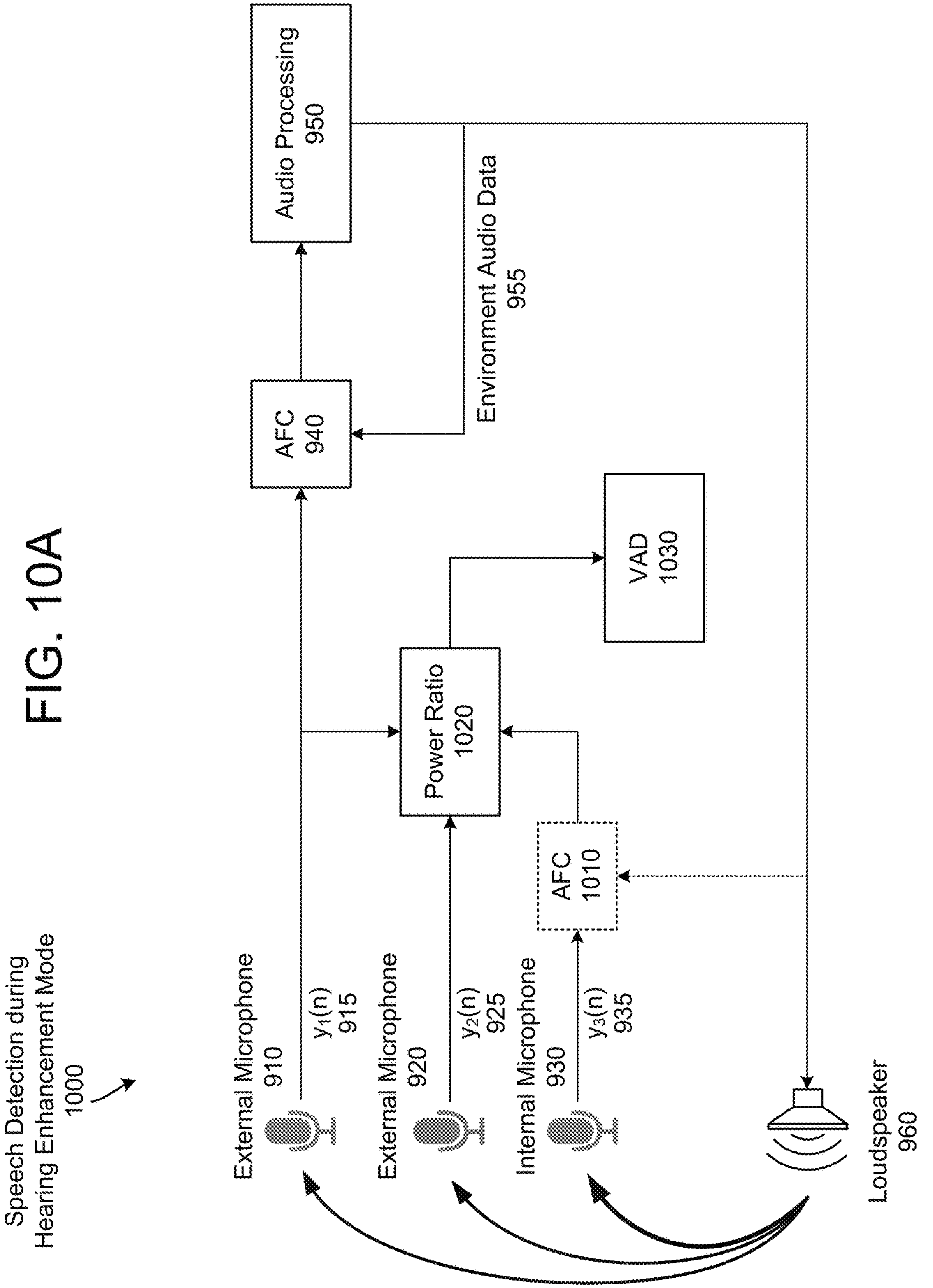
FIGS. 10A-10B illustrate example component diagrams for enabling speech detection and wakeword detection while performing hearing enhancement according to embodiments of the present disclosure.
Figure 10B:
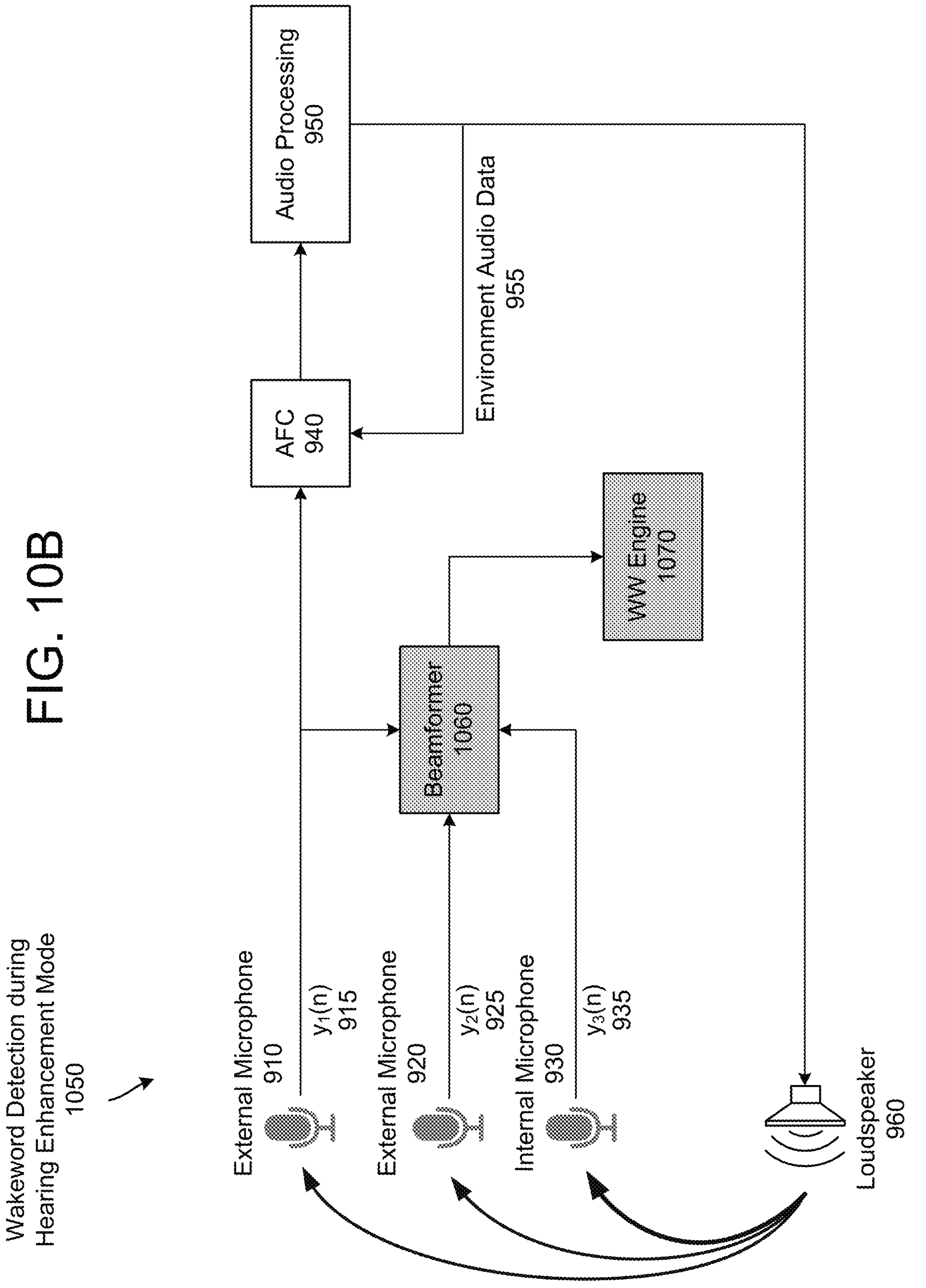

FIGS. 10A-10B illustrate example component diagrams for enabling speech detection and wakeword detection while performing hearing enhancement according to embodiments of the present disclosure. FIG. 10A illustrates an example of performing speech detection during hearing enhancement mode 1000. As illustrated in FIG. 10A, during hearing enhancement mode the device 110 may generate output audio using a loudspeaker 960 and the environment audio data 955, which includes a representation of environmental noise. To enable speech detection when hearing enhancement mode is active, the device 110 may include an Acoustic Feedback Canceler (AFC) component 1010 that removes environmental noise captured by the internal microphone 930. For example, the AFC component 1010 may receive internal audio data 935 [$y_3(n)$] generated by the internal microphone 930 and may perform AFC processing using the environment audio data 955, removing or reducing acoustic feedback associated with the playback audio.

While FIG. 10A illustrates the AFC component 940 and the AFC component 1010 both performing AFC processing using the environment audio data 955, the AFC processing performed by these components may vary without departing from the disclosure. For example, the AFC component 940 may perform first AFC processing having a first complexity, while the AFC component 1010 may perform second AFC processing having a second complexity that is simpler than the first AFC processing. In some examples, the AFC component 940 may perform AFC with PEM-NLMS processing 700 as illustrated in FIG. 7, which uses LPC coefficient values and includes additional complexity, whereas the AFC component 1010 may perform the AFC processing 600 illustrated in FIG. 6, although the disclosure is not limited thereto. Additionally or alternatively, the AFC component 940 may perform AFC processing in a frequency domain, while the AFC component 1010 may perform AFC processing in a time domain without departing from the disclosure.

As described above, the first external microphone 910 may generate the first external audio data 915 [$y_1(n)$] and the second external microphone 920 may generate the second external audio data 925 [$y_2(n)$]. As illustrated in FIG. 10A, a power ratio component 1020 may determine a power ratio value using a first power value associated with the first external audio data 915 [$y_1(n)$], a second power value associated with the second external audio data 925 [$y_2(n)$], and a third power value associated with an output of the AFC component 1010. Thus, the AFC component 1010 may maintain the power ratio evenly between when the hearing enhancement mode is active or inactive without departing from the disclosure.

If the power ratio component 1020 determines that the power ratio value satisfies a condition, the power ratio component 1020 may send a notification and/or audio data to a voice activity detector (VAD) component 1030 to perform VAD processing and/or generate VAD output data. For example, the power ratio component 1020 may determine that the power ratio value is below a threshold value, which may indicate that the user is talking, and may trigger the VAD component 1030 to perform VAD processing. However, the disclosure is not limited thereto, and in some examples the power ratio component 1020 may be associated with the VAD component 1030 and the VAD component 1030 may generate an output indicating that voice activity is detected in response to the power ratio value being below the threshold value. For example, the power ratio component 1020 determining that the power ratio value is below the threshold value may be part of the VAD processing and the VAD component 1030 may generate the VAD output data without performing additional VAD processing without departing from the disclosure. In response to the power ratio value being below the threshold value, the device 110 may exit a low-power mode (e.g., enter a high-power mode associated with normal operation) and perform additional processing, although the disclosure is not limited thereto.

FIG. 10B illustrates an example of performing wakeword detection during hearing enhancement mode 1050. If the VAD component 1030 performs speech detection and determines that the user is talking, the device 110 may perform wakeword detection. For example, the device 110 may perform beamforming using a beamformer component 1060 and output beamformed audio data to a wakeword engine component 1070 to perform wakeword detection. As the playback audio does not cause interference that impacts wakeword detection, the device 110 does not perform additional processing to remove the acoustic feedback prior to the beamformer component 1060. Instead, the beamformer component 1060 may be configured to perform beamforming to isolate audio from a particular direction, such as a direction associated with the user 5. For example, the beamformer component 1060 may be configured to determine a look-direction associated with the user 5 and perform beamforming to generate beamformed audio data boosting target audio received from the look-direction and dampening audio received from all other directions. As the beamformed audio data represents speech generated by the user 5, the wakeword engine component 1070 may detect a wakeword spoken by the user 5 while ignoring a wakeword spoken by other users without departing from the disclosure.

Figure 11A:
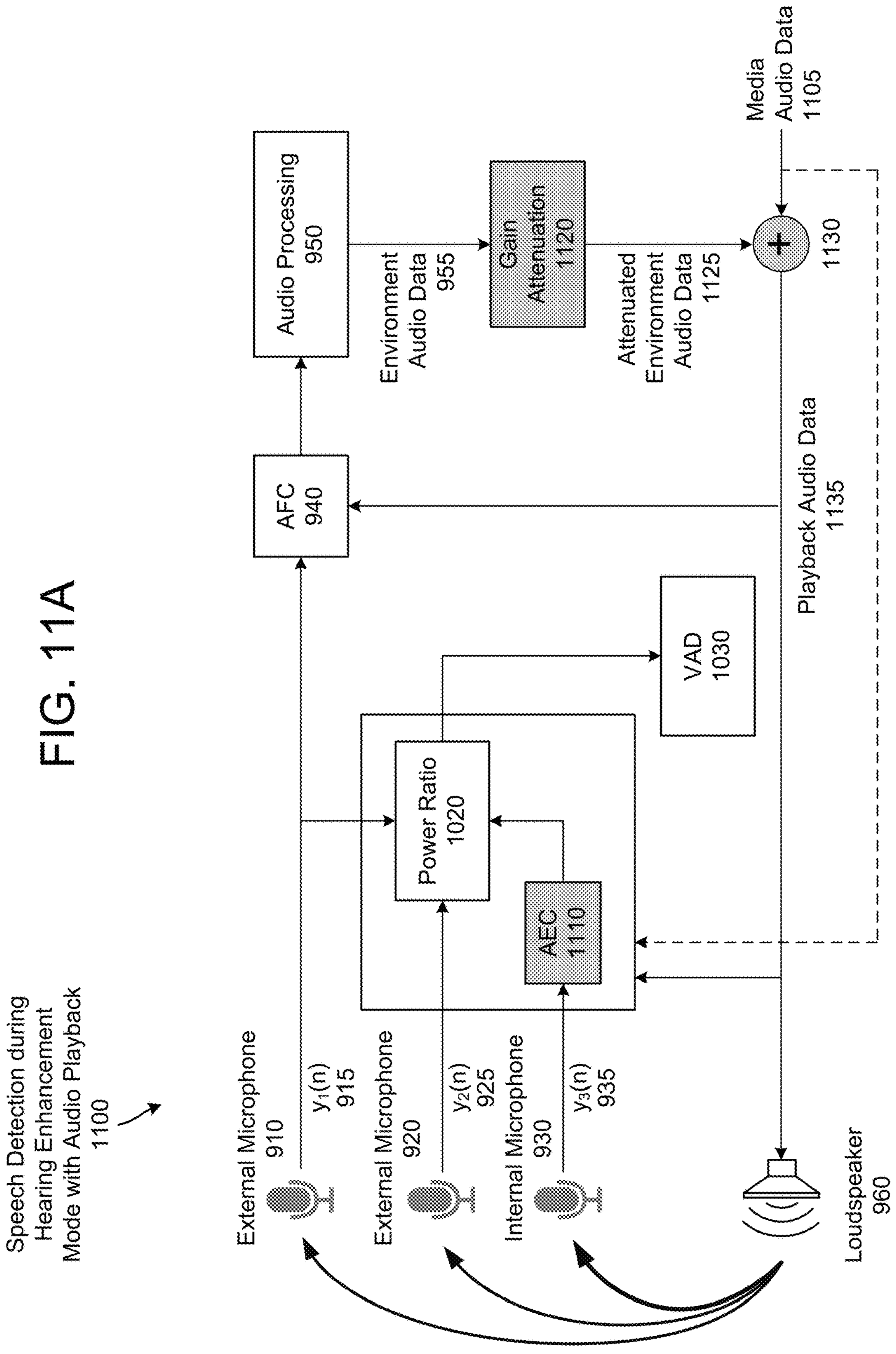
FIGS. 11A-11B illustrate example component diagrams for enabling speech detection and wakeword detection while performing hearing enhancement with audio playback according to embodiments of the present disclosure.
Figure 11B:
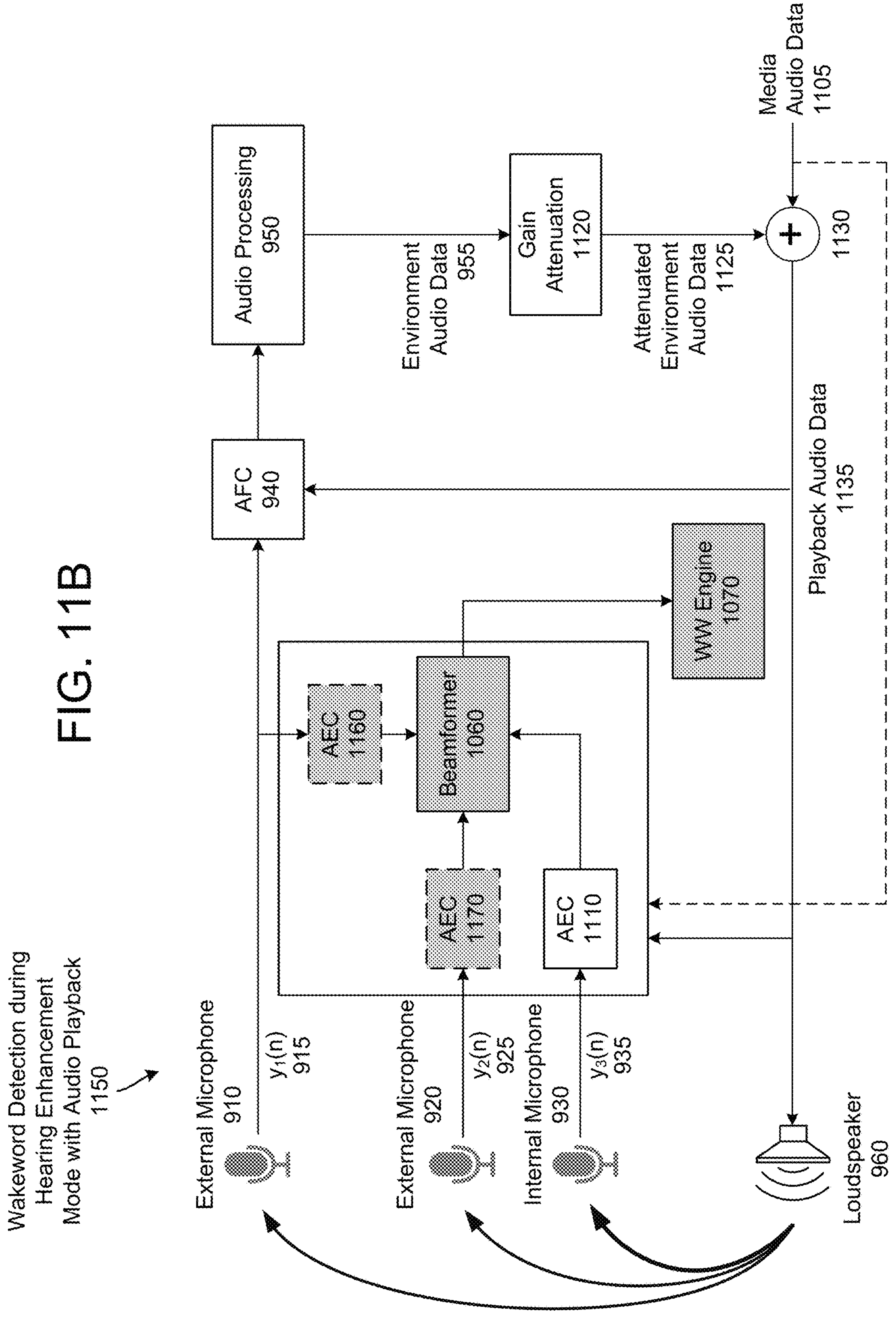

FIGS. 11A-11B illustrate example component diagrams for enabling speech detection and wakeword detection while performing hearing enhancement with audio playback according to embodiments of the present disclosure. FIG. 11A illustrates an example of performing speech detection during hearing enhancement mode with audio playback 1100. As illustrated in FIG. 11A, the device 110 may generate output audio using the loudspeaker 960 and playback audio data 1135 that includes a representation of environmental noise and a representation of media playback.

To enable speech detection when both hearing enhancement and media playback is active, the device 110 may include an Acoustic Echo Cancellation (AEC) component 1110 that removes the playback audio recaptured by the internal microphone 930 (e.g., echo signal). For example, the AEC component 1110 may receive the internal audio data 935 [$y_3(n)$] generated by the internal microphone 930 and may perform AEC processing using playback audio data 1135, removing or reducing acoustic echo associated with the playback audio.

As described above, the first external microphone 910 may generate the first external audio data 915 [$y_1(n)$] and the second external microphone 920 may generate the second external audio data 925 [$y_2(n)$]. As illustrated in FIG. 11A, the power ratio component 1020 may determine a power ratio value using the first power value associated with the first external audio data 915 [$y_1(n)$], the second power value associated with the second external audio data 925 [$y_2(n)$], and a third power value associated with an output of the AEC component 1110. Thus, the AEC component 1110 may maintain the power ratio evenly between when the hearing enhancement mode is active or inactive without departing from the disclosure.

If the power ratio component 1020 determines that the power ratio value satisfies a condition, the power ratio component 1020 may send a notification and/or audio data to a voice activity detector (VAD) component 1030 to perform VAD processing. For example, the power ratio component 1020 may determine that the power ratio value is below a threshold value, which may indicate that the user is talking, and may trigger the VAD component 1030 to perform VAD processing.

As described above, the device 110 may generate the playback audio data 1135 using a combination of the environment audio data 955 and the media audio data 1105. For example, a gain attenuation component 1120 may apply attenuation (e.g., −12 dB, although the disclosure is not limited thereto) to the environment audio data 955 to generate attenuated environment audio data 1125, and a combiner component 1130 may combine the attenuated environment audio data 1125 and the media audio data 1105 to generate the playback audio data 1135.

As both the environmental noise and the media playback is represented in the output audio, the AEC component 1110 may perform AEC processing to remove the echo signal. As illustrated in FIG. 11A, the AEC component 1110 may receive two reference signals, the playback audio data 1135 and the media audio data 1105. For example, the media audio data 1105 includes a representation of the media playback and may be used as a first reference signal (e.g., filter update reference) prior to active noise cancellation (ANC) processing (pre-ANC), while the playback audio data 1135 may include a representation of both the environmental noise and the media playback and may be used as a second reference signal (e.g., convolution reference) after ANC processing (e.g., post-ANC).

FIG. 11B illustrates an example of performing wakeword detection during hearing enhancement mode with audio playback 1150. If the VAD component 1030 performs speech detection and determines that the user is talking, the device 110 may perform wakeword detection. For example, the device 110 may perform beamforming using a beamformer component 1060 and output beamformed audio data to a wakeword engine component 1070 to perform wakeword detection, as described above with regard to FIG. 10B. However, as the echo signal may interfere with wakeword detection, the device 110 may perform AEC processing for the external microphones 910/920 in addition to the internal microphone 930.

As illustrated in FIG. 11B, prior to the beamformer component 1060 performing beamforming, a second AEC component 1160 may perform AEC processing using the first external audio data 915 [$y_1(n)$] and a third AEC component 1170 may perform AEC processing using the second external audio data 925 [$y_2(n)$]. Thus, the beamformer component 1060 may perform beamforming using audio data generated by the AEC components 1130/1160/1170 after performing echo cancellation. While not illustrated in FIG. 11B, the beamformer component 1060 may also perform echo cancellation without departing from the disclosure. Thus, the media audio data 1105 and the playback audio data 1125 may be used as reference signals for one or more of the AEC components 1130/1160/1170 and/or the beamformer component 1060.

Figure 12:
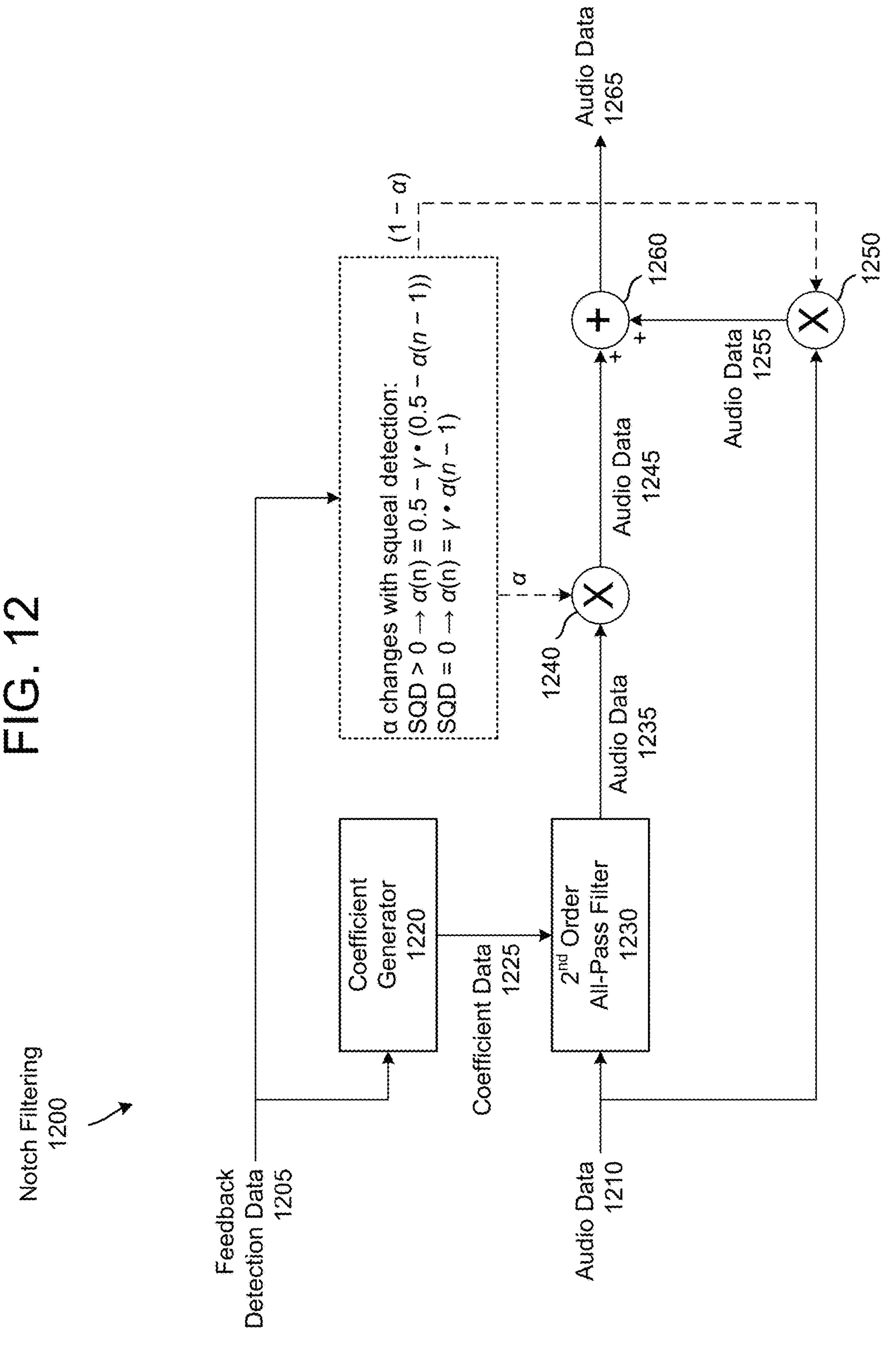
FIG. 12 illustrates an example component diagram for performing notch filtering according to embodiments of the present disclosure.

FIG. 12 illustrates an example component diagram for performing notch filtering according to embodiments of the present disclosure. As illustrated in FIG. 12, the device 110 may perform notch filtering 1200 after receiving feedback detection data 1205 that indicates whether acoustic feedback is detected and/or frequency band(s) associated with acoustic feedback. For example, an acoustic feedback detector component may determine that acoustic feedback is represented in one or more frequency bands and may generate feedback detection data 1205 indicating the one or more frequency bands. Thus, the device 110 may detect frequency band(s) representing the acoustic feedback (e.g., squeal detection) and perform notch filtering 1200 to suppress the selected frequency band(s) (e.g., squeal suppression) using one or more notch filter(s).

The device 110 may input the feedback detection data 1205 to a coefficient generator component 1220 and the coefficient generator component 1220 may generate coefficient data based on the frequency band(s) indicated by the feedback detection data 1205. For example, the coefficient generator component 1220 may generate coefficient values and output the coefficient values to a $2^{nd}$ order all-pass filter component 1230. The $2^{nd}$ order all-pass filter component 1230 may also receive audio data 1210 and may be configured to use the coefficient values to perform all-pass filtering using the audio data 1210 to generate audio data 1235. For example, the $2^{nd}$ order all-pass filter component 1230 may be configured to pass most frequency bands while applying attenuation within the frequency band(s) (e.g., making a deep notch at the reported squeal frequency). In some examples, the $2^{nd}$ order all-pass filter component 1230 may apply an all-pass filter having the form:

$$A(z) = \frac{a_2 + a_1 z^{-1} + z^{-2}}{1 + a_1 z^{-1} + a_2 z^{-2}} \quad [1]$$

although the disclosure is not limited thereto.

As illustrated in FIG. 12, the audio data 1210 represents the original (unfiltered) audio, whereas the audio data 1235 represents the filtered audio data with attenuation applied to the frequency band(s) indicated by the feedback detection data 1205. To ensure signal continuity and/or reduce distortion, the device 110 may perform notch filtering 1200 using additional components configured to apply a fade-in fade-out scheme to transition between the audio data 1210 and the audio data 1235. As illustrated in FIG. 12, the device 110 may generate an output using a combination of the audio data 1210 and the audio data 1235, with a relative weighting adjusted based on the feedback detection data 1205. For example, the device 110 may apply a first weight value (e.g., a) to the audio data 1235 while applying a second weight value (e.g., 1−α) to the audio data 1210, although the disclosure is not limited thereto.

As illustrated in FIG. 12, the device 110 may determine the first weight value differently depending on whether the feedback detection data 1205 indicates that acoustic feedback is present (e.g., squeal detection is positive) or not (e.g., squeal detection is equal to zero). For example, if acoustic feedback is not detected (e.g., SQD=0), the device 110 may determine the first weight value using a fade-out scheme:

$$\alpha(n)=\gamma*\alpha(n-1) \quad [2]$$

where α(n) denotes the first weight value for a current time index, α(n−1) denotes the first weight value for a previous time index, and y indicates a forgetting factor (e.g., γ=0.935, although the disclosure is not limited thereto). Thus, if acoustic feedback is not detected for a series of time indexes, the device 110 may apply the fade-out scheme to reduce the first weight value a based on the forgetting factor γ. Likewise, as the second weight value is a complement of the first weight value (e.g., 1−α), the inverse occurs and the device 110 may increase the second weight value at the same rate.

In contrast, if acoustic feedback is detected (e.g., SQD>0), the device 110 may determine the first weight value using a fade-in scheme:

$$\alpha(n)=0.5-\gamma*(0.5-\alpha(n-1)) \quad [3]$$

Thus, if acoustic feedback is detected for a series of time indexes, the device 110 may apply the fade-in scheme to increase the first weight value a based on the forgetting factor γ. Likewise, as the second weight value is a complement of the first weight value (e.g., 1−α), the inverse occurs and the device 110 may decrease the second weight value at the same rate. In the example illustrated in FIG. 12 and represented in Equations [2]-[3], the first weight value a may approach a maximum value (e.g., 0.5) that corresponds to an equal weighting between the audio data 1235 and the audio data 1210. However, the disclosure is not limited thereto and the device 110 may adjust Equations [2]-[3] such that the first weight value a may approach any value (e.g., 1) without departing from the disclosure.

As illustrated in FIG. 12, a first combiner component 1240 may apply the first weight value a to the audio data 1235 to generate audio data 1245. For example, the first combiner component 1240 may multiply the audio data 1235 by the first weight value a to generate the audio data 1245, although the disclosure is not limited thereto. Similarly, a second combiner component 1250 may apply the second weight value (e.g., 1−α) to generate audio data 1255. For example, the second combiner component 1240 may multiply the audio data 1210 by the second weight value (e.g., 1−α) to generate the audio data 1255, although the disclosure is not limited thereto.

As a final step, a third combiner component 1260 may combine the audio data 1245 and the audio data 1255 to generate audio data 1265 (e.g., output audio data). The audio data 1265 corresponds to the original audio data 1210, except that attenuation is applied to the selected frequency band(s) when acoustic feedback is detected, with an amount of attenuation depending on the first weight value a. Thus, the notch filtering 1200 illustrated in FIG. 12 results in the device 110 attenuating the desired frequency band(s) (e.g., creating a deep notch at a particular frequency) to reduce the acoustic feedback. The notch filtering 1200 may adapt the coefficient data 1225 dynamically, adjusting the adaptive filter as the acoustic feedback changes frequency. Thus, the device 110 may adjust the filter coefficient values in real-time to adjust to changing squeal frequencies, enabling the notch filtering 1200 to suppress acoustic feedback shortly after it begins without departing from the disclosure.

While the examples described above refer to device 110 performing the notch filtering 1200 using a forgetting factor (e.g., γ=0.935) and a maximum weight value (e.g., 0.5), the disclosure is not limited thereto. Instead, the device 110 may perform notch filtering 1200 using any forgetting factor γ and/or any maximum weight value without departing from the disclosure. Additionally or alternatively, while the example described above refers to a simple example in which the device 110 generates the audio data 1265 by applying the first weight value a and the second weight value (e.g., 1−α) uniformly across frequency, the disclosure is not limited thereto. For example, the device 110 may apply a first weight function and/or a second weight function, which comprise a plurality of weight values that vary based on frequency band, without departing from the disclosure.

Figure 13:
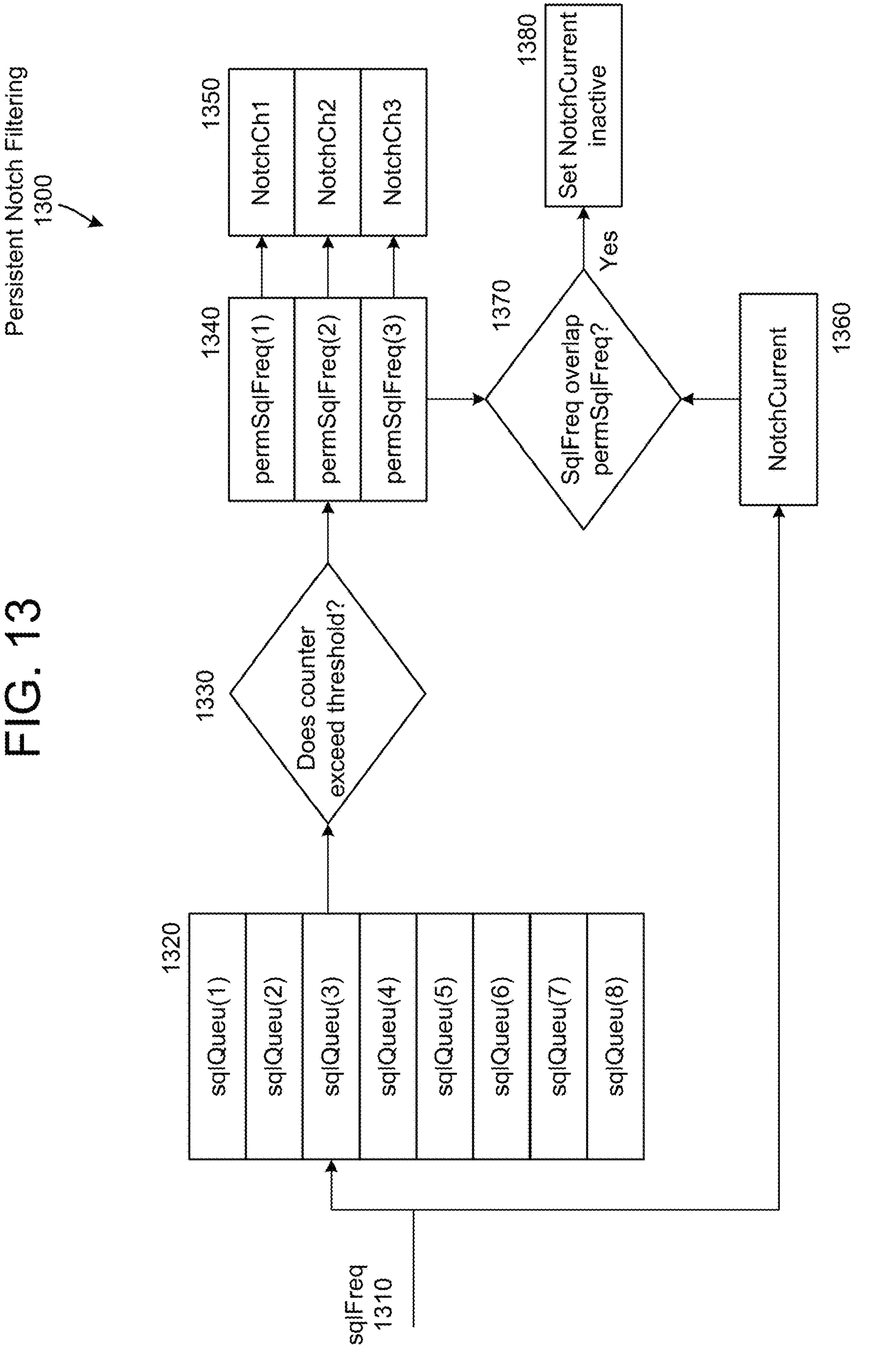
FIG. 13 illustrates an example component diagram for performing persistent notch filtering according to embodiments of the present disclosure.

FIG. 13 illustrates an example component diagram for performing persistent notch filtering according to embodiments of the present disclosure. As illustrated in FIG. 13, the device 110 may enable persistent notch filtering 1300 to suppress frequency bands that are repeatedly associated with acoustic feedback. For example, the device 110 may identify persistent or permanent frequency bands that the device 110 may attenuate to prevent future acoustic feedback.

As illustrated in FIG. 13, the device 110 may identify a current feedback frequency 1310 associated with the acoustic feedback, as described above with regard to FIG. 12. For example, the feedback frequency 1310 may correspond to one or more frequency bands in which the acoustic feedback is detected. The device 110 may compare the feedback frequency 1310 to frequency bands stored in a table 1320. For example, the table 1320 may track a first number of feedback frequencies (e.g., up to 8 individual frequency bands) and associate a counter value with each of the frequency bands. If the current feedback frequency 1310 matches an entry included in the table 1320, the device 110 may increment a counter value corresponding to the matched entry. If the feedback frequency 1310 does not match an entry in the table 1320, the device 110 may add a new entry to the table 1320 and/or replace a previous entry with the feedback frequency 1310.

The device 110 may determine (1330) whether the counter value associated with the matched entry exceeds a threshold value and, if so, the device 110 may determine that the frequency band associated with the entry corresponds to persistent acoustic feedback. For example, the device 110 may add the frequency band to a persistent notch filter table 1340. In the example illustrated in FIG. 13, the persistent notch filter table 1340 may include a second number of frequency bands (e.g., 3) and each frequency band may be used to apply an individual notch filter of a second number of notch filters 1350. Thus, the persistent notch filtering 1300 may apply up to three notch filters to suppress the frequency bands associated with persistent acoustic feedback.

In addition to the persistent notch filtering, the device 110 may apply a current notch filter 1360 using the feedback frequency 1310. However, the device 110 may determine (1370) whether the feedback frequency 1310 overlaps with any of the persistent frequency bands stored in the persistent notch filter table 1340. If the feedback frequency 1310 overlaps with one of the persistent frequency bands, the device 110 may set (1380) the current notch filter 1360 as inactive.

Figure 14:
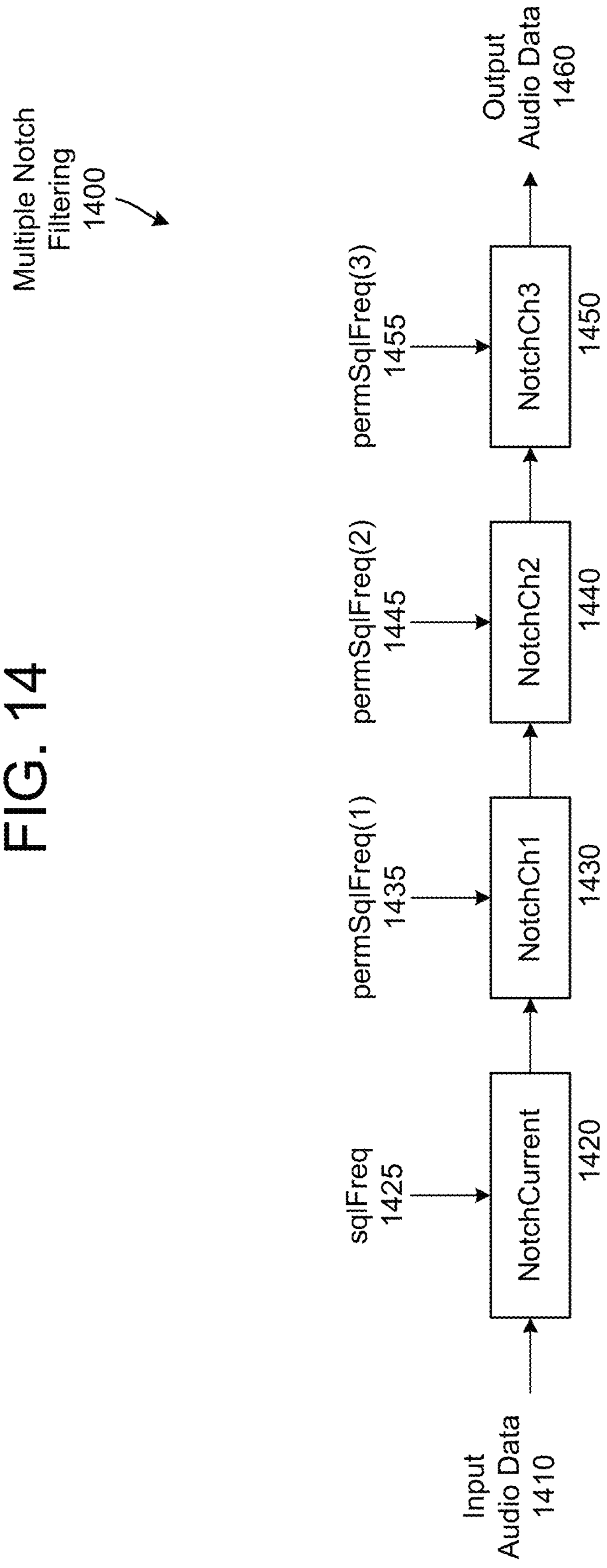
FIG. 14 illustrates an example component diagram for performing multiple notch filtering according to embodiments of the present disclosure.

FIG. 14 illustrates an example component diagram for performing multiple notch filtering according to embodiments of the present disclosure. As illustrated in FIG. 14, the device 110 may apply multiple notch filtering 1400 using a number of notch filter components in series. For example, the device 110 may apply a current notch filter 1420 and a first number of persistent notch filters without departing from the disclosure. In the example illustrated in FIG. 14, the device 110 may apply up to three persistent notch filters, including a first persistent notch filter 1430, a second persistent notch filter 1440, and a third persistent notch filter 1450.

When the device 110 performs multiple notch filtering 1400, the device 110 may process input audio data 1410 using each of the notch filters to generate output audio data 1460. For example, the current notch filter 1420 may apply a first notch filter that attenuates a current feedback frequency band 1425, the first persistent notch filter 1430 may apply a second notch filter that attenuates a first persistent feedback frequency band 1435, the second persistent notch filter 1440 may apply a third notch filter that attenuates a second persistent feedback frequency band 1445, and the third persistent notch filter 1450 may apply a fourth notch filter that attenuates a third persistent feedback frequency band 1455. However, the disclosure is not limited thereto and the number of notch filters may vary without departing from the disclosure.

Figure 15A:
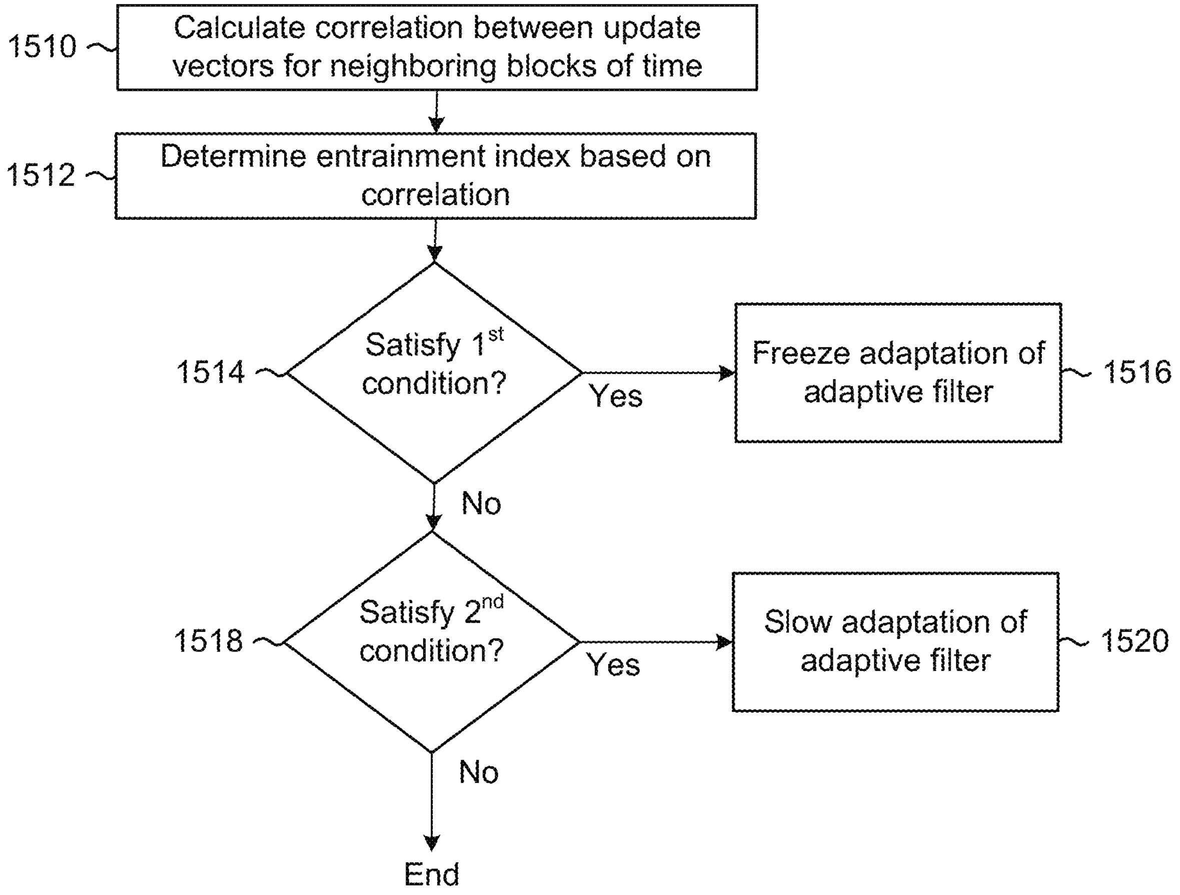
FIGS. 15A-15B are flowcharts conceptually illustrating an example method for performing entrainment prevention according to embodiments of the present disclosure.
Figure 15B:
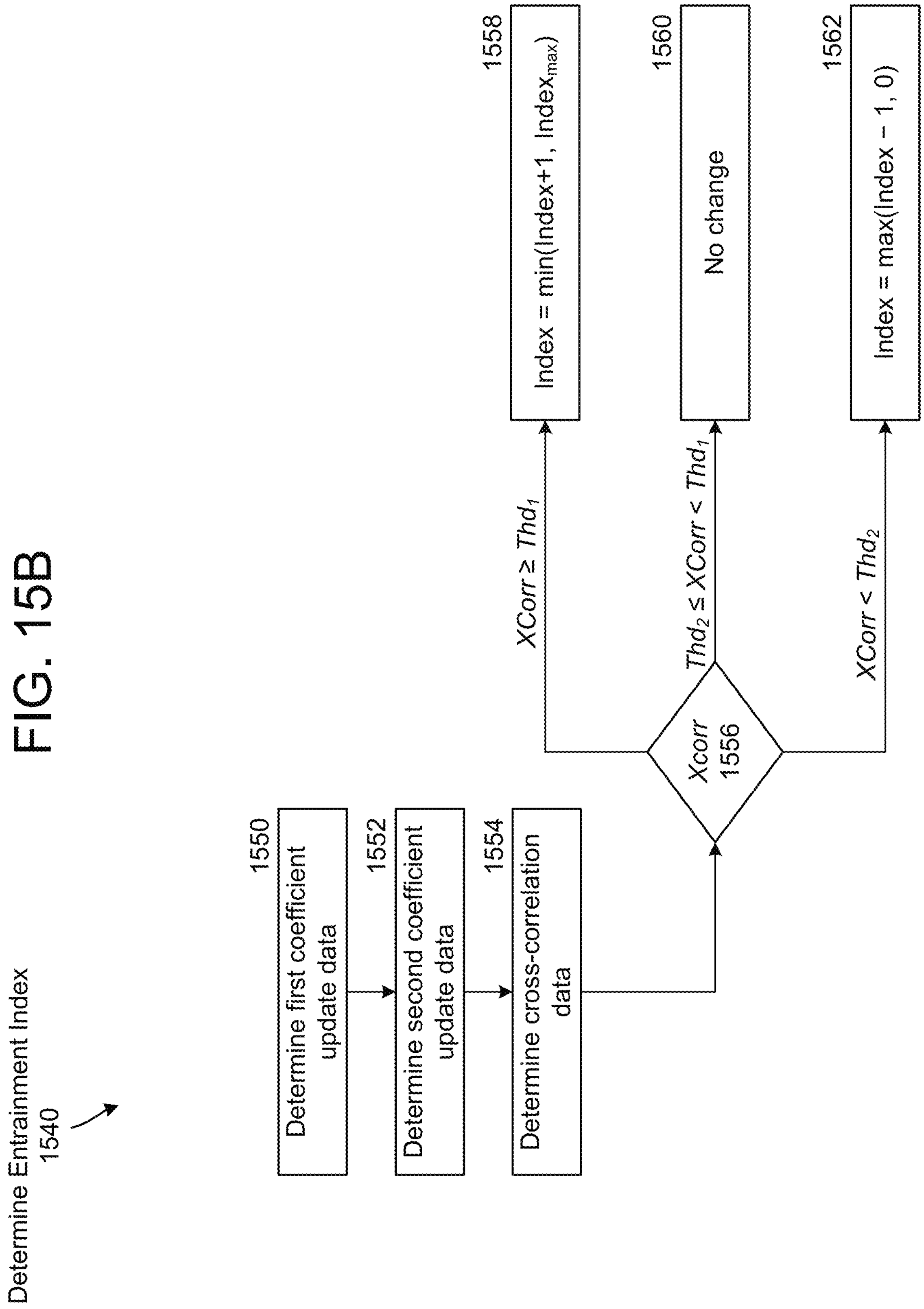

FIGS. 15A-15B are flowcharts conceptually illustrating an example method for performing entrainment prevention according to embodiments of the present disclosure. When periodic signals are present in audio data, an adaptive filter used to perform acoustic feedback cancellation processing may deviate from an actual impulse response that the adaptive filter is intended to approximate. This deviation may be referred to as entrainment and may prevent the adaptive filter from accurately performing AFC processing. To limit the amount of deviation and improve AFC processing, the device 110 may detect the entrainment and modify adaptation of the adaptive filter. For example, the device 110 may slow an adaptation rate associated with the adaptive filter, may freeze the adaptation rate, and/or the like without departing from the disclosure.

In order to detect entrainment, the device 110 may monitor a consistency between update vectors of an adaptive filter used to perform acoustic feedback cancellation. To illustrate an example, an update vector (e.g., block update) may represent changes to adaptive filter coefficients used by the adaptive filter, and the device 110 may compare update vectors associated with consecutive blocks of time (e.g., 4 ms/block, although the disclosure is not limited thereto). When audio data represents ordinary speech, a first correlation between two consecutive update vectors may be relatively low. In contrast, when the audio data includes a periodic signal, a second correlation between two consecutive update vectors may be relatively high. Thus, the device 110 may determine that a periodic signal is represented in the audio data by detecting a high correlation between two consecutive update vectors.

As illustrated in FIG. 15A, the device 110 may calculate (1510) a correlation between update vectors to the adaptive filter for consecutive blocks of time and may determine (1512) an entrainment index based on the correlation. For example, the device 110 may calculate a correlation value between the update vectors and determine an entrainment index corresponding to an amount of entrainment. In some examples, the device 110 may determine the entrainment index using the technique illustrated in FIG. 15B, although the disclosure is not limited thereto and the entrainment index may be equal to the correlation value without departing from the disclosure.

The device 110 may determine (1514) whether the entrainment index satisfies a first condition and, if so, may freeze (1516) adaptation of the adaptive filter. For example, the device 110 may determine that the entrainment index is above a first threshold value, which indicates that the correlation between consecutive update vectors is relatively high, and may completely stop adaptation for the adaptive filter.

If the device 110 determines that the entrainment index does not satisfy the first condition, the device 110 may determine (1518) whether the entrainment index satisfies a second condition. If the entrainment index does not satisfy the second condition, the device 110 may do nothing and the process will end. However, if the entrainment index satisfies the second condition, the device 110 may slow (1520) adaptation of the adaptive filter. For example, the device 110 may determine that the entrainment index is above a second threshold value, which indicates that the correlation between consecutive update vectors is somewhat high, and may reduce an adaptation rate associated with the adaptive filter.

As illustrated in FIG. 15B, the device 110 may determine an entrainment index 1540 by determining normalized cross-correlation data using first coefficient update data (e.g., last update) and second coefficient update data (e.g., new update) associated with an adaptive filter. For example, the device 110 may initialize the entrainment index as a first value (e.g., 0) and may compare the normalized cross-correlation to two threshold values to update the entrainment index, which may vary between the first value and a maximum value (e.g., $Index_{max}$).

As illustrated in FIG. 15B, the device 110 may determine (1550) first coefficient update data (e.g., last coefficients update), may determine (1552) second coefficient update data (e.g., new coefficients update), and may determine (1554) cross-correlation data. For example, the device 110 may perform a normalized cross-correlation between the first coefficient update data and the second coefficient update data, although the disclosure is not limited thereto.

The device 110 may determine (1556) whether the cross-correlation data satisfies a first condition, a second condition, or a third condition. For example, if the cross-correlation data exceeds a first threshold value (e.g., $X_{Corr} \geq Thd_1$), the cross-correlation data satisfies the first condition and the device 110 may determine (1558) the entrainment index by incrementing the previous entrainment index until the maximum value, as shown below:

$$Index = \min(Index+1, Index_{max}) \quad [4]$$

where Index denotes the current entrainment index and $Index_{max}$ indicates a maximum entrainment index value.

In contrast, if the cross-correlation data exceeds a second threshold value but not the first threshold value (e.g., $Thd_2 \leq X_{Corr} < Thd_1$), the cross-correlation data satisfies the second condition and the device 110 may determine (1560) that the entrainment index did not change (e.g., no change), such that the entrainment index is equal to a previous entrainment index.

Finally, the cross-correlation data satisfies the third condition if the cross-correlation data is below the second threshold value (e.g., $X_{Corr} < Thd_2$), in which case the device 110 may determine (1562) the entrainment index by decrementing the previous entrainment index until a minimum value (e.g., 0) is reached, as shown below:

$$Index = \max(Index-1, 0) \quad [5]$$

Figure 16:
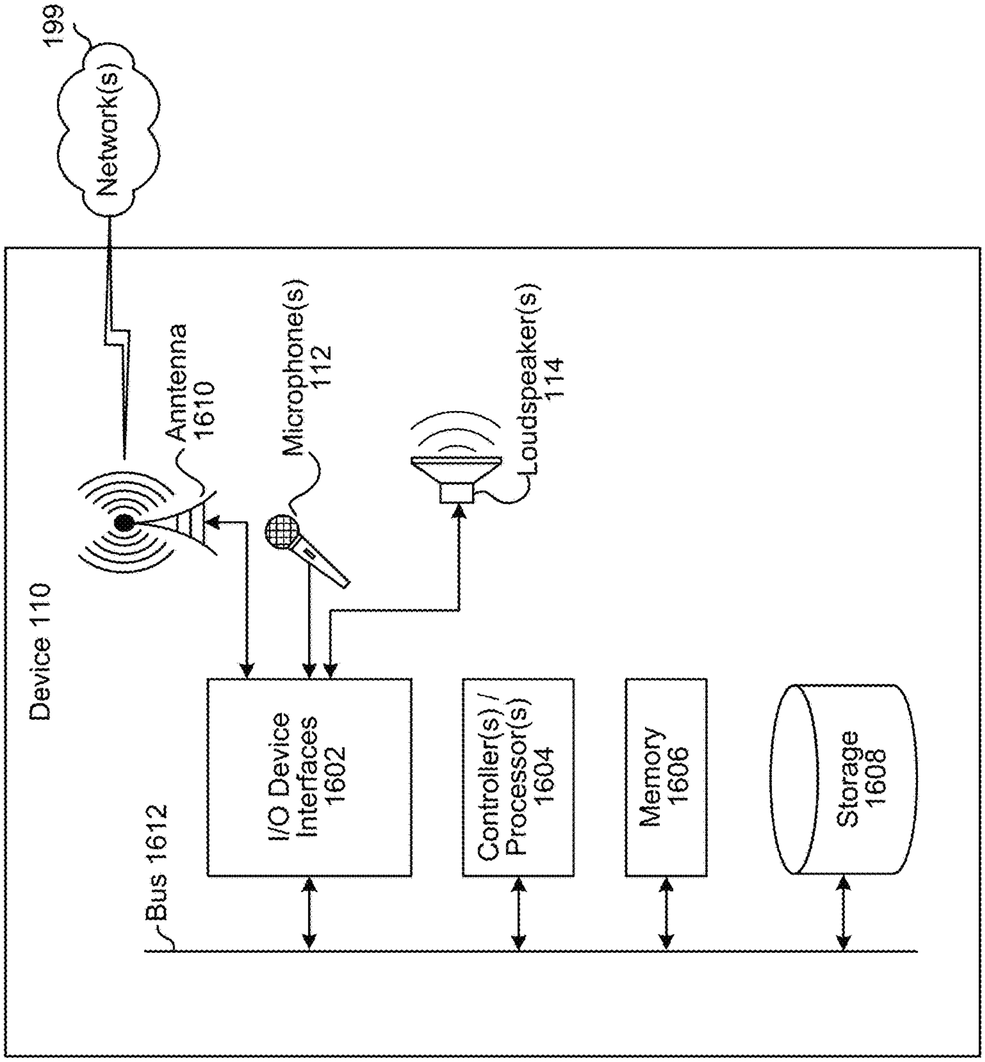
FIG. 16 is a block diagram conceptually illustrating example components of a system for beamforming according to embodiments of the present disclosure.

FIG. 16 is a block diagram conceptually illustrating example components of the system 100. In operation, the system 100 may include computer-readable and computer-executable instructions that reside on the system, as will be discussed further below. The system 100 may include one or more audio capture device(s), such as microphones 112. The audio capture device(s) may be integrated into a single device or may be separate. The system 100 may also include an audio output device for producing sound, such as loudspeaker(s) 114. The audio output device may be integrated into a single device or may be separate. The system 100 may include an address/data bus 1612 for conveying data among components of the system 100. Each component within the system may also be directly connected to other components in addition to (or instead of) being connected to other components across the bus 1612.

The system 100 may include one or more controllers/processors 1604 that may each include a central processing unit (CPU) for processing data and computer-readable instructions, and a memory 1606 for storing data and instructions. The memory 1606 may include volatile random access memory (RAM), non-volatile read only memory (ROM), non-volatile magnetoresistive (MRAM) and/or other types of memory. The system 100 may also include a data storage component 1608, for storing data and controller/processor-executable instructions (e.g., instructions to perform operations discussed herein). The data storage component 1608 may include one or more non-volatile storage types such as magnetic storage, optical storage, solid-state storage, etc. The system 100 may also be connected to removable or external non-volatile memory and/or storage (such as a removable memory card, memory key drive, networked storage, etc.) through the input/output device interfaces 1602.

Computer instructions for operating the system 100 and its various components may be executed by the controller(s)/processor(s) 1604, using the memory 1606 as temporary "working" storage at runtime. The computer instructions may be stored in a non-transitory manner in non-volatile memory 1606, storage 1608, and/or an external device. Alternatively, some or all of the executable instructions may be embedded in hardware or firmware in addition to or instead of software.

The system may include input/output device interfaces 1602. A variety of components may be connected through the input/output device interfaces 1602, such as the loudspeaker(s) 114/202, the microphone(s) 112/204/205/206, and a media source such as a digital media player (not illustrated). The input/output interfaces 1602 may include A/D converters (not shown) and/or D/A converters (not shown).

The input/output device interfaces 1602 may also include an interface for an external peripheral device connection such as universal serial bus (USB), FireWire, Thunderbolt or other connection protocol. The input/output device interfaces 1602 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network(s) 199, the system 100 may be distributed across a networked environment.

Figure 17:
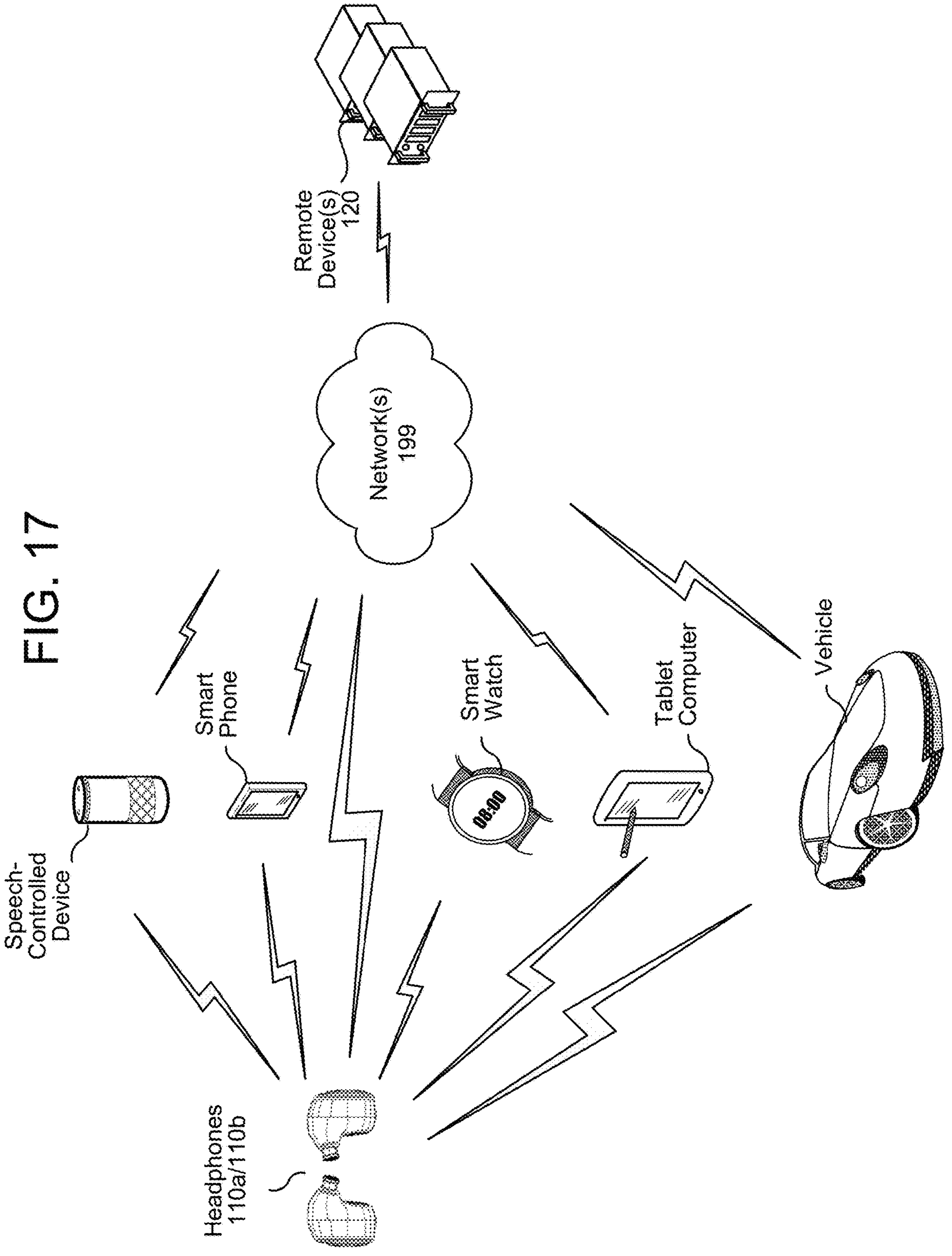
FIG. 17 is a diagram conceptually illustrating example communication between components of a system for beamforming according to embodiments of the present disclosure.

As illustrated in FIGS. 17, multiple devices may contain components of the system 100 and the devices may be connected over network(s) 199. The network(s) 199 may include one or more local-area or private networks and/or a wide-area network, such as the internet. Devices may be connected to the network(s) 199 through either wired or wireless connections. For example, a speech-controlled device, a tablet computer, a smart phone, a smart watch, and/or a vehicle may be connected to the network(s) 199 through a wireless service provider, over a WiFi or cellular network connection, or the like. Other devices are included as network-connected support devices, such as one or more supporting device(s) 120 that may be connected to the network(s) 199 and may communicate with the other devices therethrough. The headphones 110*a*/110*b* may similarly be connected to the supporting device(s) 120 either directly or via a network connection to one or more of the local devices. The headphones 110*a*/110*b* may capture audio using one or more microphones or other such audio-capture devices; the headphones 110*a*/110*b* may perform audio processing, voice-activity detection, and/or wakeword detection, and the remove device(s) 120 may perform automatic speech recognition, natural-language processing, or other functions.

Multiple devices may be employed in a single system 100. In such a multi-device system, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system. For example, certain components, such as the beamforming components, may be arranged as illustrated or may be arranged in a different manner, or removed entirely and/or joined with other non-illustrated components.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, components of system may be implemented in firmware and/or hardware, such as an acoustic front end (AFE), which comprises, among other things, analog and/or digital filters (e.g., filters configured as firmware to a digital signal processor (DSP)). Some or all of the beamforming component 802 may, for example, be implemented by a digital signal processor (DSP).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

generating, by a loudspeaker of an in-ear device, first output audio using first playback audio data;

generating, using a first microphone of the in-ear device, first audio data including a representation of the first output audio and a first representation of environmental noise;

generating, using the first audio data and the first playback audio data, second audio data, the generating comprising:

determining first coefficient data associated with an adaptive filter, determining reference audio data using the first playback audio data and the first coefficient data, and generating the second audio data by subtracting the reference audio data from the first audio data;

determining that first acoustic feedback is represented in a portion of the second audio data, the portion of the second audio data associated with a first frequency range;

generating, using the second audio data and a first filter associated with the first frequency range, third audio data including a second representation of the environmental noise; and generating, by the loudspeaker, second output audio based on the third audio data.

2. The computer-implemented method of claim 1, further comprising, prior to generating the first output audio:

generating, using the first microphone, fourth audio data including a third representation of the environmental noise;

generating, using the fourth audio data, fifth audio data by performing acoustic feedback cancellation; and generating the first playback audio data using the fifth audio data, wherein the first playback audio data includes a fourth representation of the environmental noise.

3. The computer-implemented method of claim 1, further comprising:

receiving, by the in-ear device, fourth audio data including a first representation of audio content; and generating, using the third audio data and the fourth audio data, second playback audio data that includes a second representation of the audio content and a third representation of the environmental noise, wherein the second output audio is generated using the second playback audio data.

4. The computer-implemented method of claim 1, further comprising:

generating, using the first microphone, fourth audio data including a representation of the second output audio and a third representation of the environmental noise;

generating, using the third audio data and the fourth audio data, fifth audio data;

determining that second acoustic feedback is represented in a portion of the fifth audio data, the portion of the fifth audio data associated with a second frequency range; and generating, using the fifth audio data and a second filter associated with the second frequency range, sixth audio data including a fourth representation of the environmental noise.

5. The computer-implemented method of claim 1, wherein generating the third audio data further comprises:

determining, using the first frequency range, second coefficient data associated with the first filter;

generating, using the second audio data and the second coefficient data, fourth audio data;

determining a weight value based on the first acoustic feedback; and generating the third audio data using the second audio data, the fourth audio data, and the weight value.

6. The computer-implemented method of claim 1, further comprising:

determining a first number of times that the first frequency range has been associated with the first acoustic feedback;

determining that the first number satisfies a condition; and changing a setting of the in-ear device to enable the first filter regardless of the detection of the first acoustic feedback.

7. The computer-implemented method of claim 1, wherein generating the third audio data further comprises:

determining, using the first frequency range, second coefficient data associated with the first filter;

determining that a second frequency range is associated with persistent acoustic feedback;

determining, using the second frequency range, third coefficient data associated with a second filter; and generating the third audio data using the second audio data, the second coefficient data, and the third coefficient data.

8. The computer-implemented method of claim 1, further comprising:

detecting a periodic signal represented in the first audio data; and in response to detecting the periodic signal, changing an adaptation rate associated with the adaptive filter from a first value to a second value that is lower than the first value.

9. The computer-implemented method of claim 1, further comprising:

determining first vector data, the first vector data indicating first differences between second coefficient data associated with the adaptive filter and the first coefficient data;

determining second vector data, the second vector data indicating second differences between the first coefficient data and third coefficient data associated with the adaptive filter;

determining a correlation value using the first vector data and the second vector data;

determining that the correlation value exceeds a threshold value; and changing an adaptation rate associated with the adaptive filter from a first value to a second value that is lower than the first value.

10. The computer-implemented method of claim 1, wherein determining the first coefficient data further comprises:

determining second coefficient data;

determining fourth audio data using the first audio data and the second coefficient data;

determining second playback audio data using the first playback audio data and the second coefficient data;

determining fifth audio data by subtracting the second playback audio data from the fourth audio data; and determining the first coefficient data by updating the adaptive filter using the fifth audio data.

11. A system comprising:

at least one processor; and memory including instructions operable to be executed by the at least one processor to cause the system to:

generate, by a loudspeaker of an in-ear device, first output audio using first playback audio data;

generate, using a first microphone of the in-ear device, first audio data including a representation of the first output audio and a first representation of environmental noise;

generate, using the first audio data and the first playback audio data, second audio data, the generating comprising:

determining first coefficient data associated with an adaptive filter, determining reference audio data using the first playback audio data and the first coefficient data, and generating the second audio data by subtracting the reference audio data from the first audio data;

determine that first acoustic feedback is represented in a portion of the second audio data, the portion of the second audio data associated with a first frequency range;

generate, using the second audio data and a first filter associated with the first frequency range, third audio data including a second representation of the environmental noise; and generate, by the loudspeaker, second output audio based on the third audio data.

12. The system of claim 11, wherein the memory further comprises instructions that, when executed by the at least one processor, further cause the system to:

generate, using the first microphone, fourth audio data including a third representation of the environmental noise;

generate, using the fourth audio data, fifth audio data by performing acoustic feedback cancellation; and generate the first playback audio data using the fourth audio data, wherein the first playback audio data includes a fourth representation of the environmental noise.

13. The system of claim 11, wherein the memory further comprises instructions that, when executed by the at least one processor, further cause the system to:

receive, by the in-ear device, fourth audio data including a first representation of audio content; and generate, using the third audio data and the fourth audio data, second playback audio data that includes a second representation of the audio content and a third representation of the environmental noise, wherein the second output audio is generated using the second playback audio data.

14. The system of claim 11, wherein the memory further comprises instructions that, when executed by the at least one processor, further cause the system to:

generate, using the first microphone, fourth audio data including a representation of the second output audio and a third representation of the environmental noise;

generate, using the third audio data and the fourth audio data, fifth audio data;

determine that second acoustic feedback is represented in a portion of the fifth audio data, the portion of the fifth audio data associated with a second frequency range; and generate, using the fifth audio data and a second filter associated with the second frequency range, sixth audio data including a fourth representation of the environmental noise.

15. The system of claim 11, wherein the memory further comprises instructions that, when executed by the at least one processor, further cause the system to:

determine, using the first frequency range, second coefficient data associated with the first filter;

generate, using the second audio data and the second coefficient data, fourth audio data;

determine a weight value based on the first acoustic feedback; and generate the third audio data using the second audio data, the fourth audio data, and the weight value.

16. The system of claim 11, wherein the memory further comprises instructions that, when executed by the at least one processor, further cause the system to:

determine a first number of times that the first frequency range has been associated with the first acoustic feedback;

determine that the first number satisfies a condition; and change a setting of the in-ear device to enable the first filter regardless of the detection of the first acoustic feedback.

17. The system of claim 11, wherein the memory further comprises instructions that, when executed by the at least one processor, further cause the system to:

determine, using the first frequency range, second coefficient data associated with the first filter;

determine that a second frequency range is associated with persistent acoustic feedback;

determine, using the second frequency range, third coefficient data associated with a second filter; and generate the third audio data using the second audio data, the second coefficient data, and the third coefficient data.

18. The system of claim 11, wherein the memory further comprises instructions that, when executed by the at least one processor, further cause the system to:

detect a periodic signal represented in the first audio data; and in response to detecting the periodic signal, change an adaptation rate associated with the adaptive filter from a first value to a second value that is lower than the first value.

19. The system of claim 11, wherein the memory further comprises instructions that, when executed by the at least one processor, further cause the system to:

determine first vector data, the first vector data indicating first differences between second coefficient data associated with the adaptive filter and the first coefficient data;

determine second vector data, the second vector data indicating second differences between the first coefficient data and third coefficient data associated with the adaptive filter;

determine a correlation value using the first vector data and the second vector data;

determine that the correlation value exceeds a threshold value; and change an adaptation rate associated with the adaptive filter from a first value to a second value that is lower than the first value.

20. The system of claim 11, wherein the memory further comprises instructions that, when executed by the at least one processor, further cause the system to:

determine second coefficient data;

determine fourth audio data using the first audio data and the second coefficient data;

determine second playback audio data using the first playback audio data and the second coefficient data;

determine fifth audio data by subtracting the second playback audio data from the fourth audio data; and determine the first coefficient data by updating the adaptive filter using the fifth audio data.

* * * * *